United States Patent
Thiruvengadathan et al.

(10) Patent No.: US 12,093,964 B2
(45) Date of Patent: *Sep. 17, 2024

(54) AUTOMATED RULES EXECUTION TESTING AND RELEASE SYSTEM

(71) Applicant: Capital One Services, LLC, McLean, VA (US)

(72) Inventors: Sathiyamurthy Thiruvengadathan, Glen Allen, VA (US); Lakshmi Ph Kommaraju, Glen Allen, VA (US); David Parsons, Richmond, VA (US); Nirmit Patel, Henrico, VA (US); Uday Kumar Dikshit, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,502

(22) Filed: Jul. 7, 2023

(65) Prior Publication Data

US 2023/0351401 A1 Nov. 2, 2023

Related U.S. Application Data

(63) Continuation of application No. 17/140,774, filed on Jan. 4, 2021, now Pat. No. 11,763,312.

(51) Int. Cl.
*G06Q 20/00* (2012.01)
*G06F 8/61* (2018.01)
(Continued)

(52) U.S. Cl.
CPC ............ *G06Q 20/405* (2013.01); *G06F 8/61* (2013.01); *G06F 16/245* (2019.01); *G06Q 10/0633* (2013.01); *G06Q 20/40* (2013.01)

(58) Field of Classification Search
USPC .......................................................... 705/44
See application file for complete search history.

(56) References Cited

U.S. PATENT DOCUMENTS 5,907,801 A * 5/1999 Albert .................. H04M 15/68
 340/5.4
8,001,422 B1 8/2011 Sun et al.
(Continued)

OTHER PUBLICATIONS

Rozsnyai, Szabolcs, et al. "Business process insight: an approach and platform for the discovery and analysis of end-to-end business processes." 2012 Annual SRII Global Conference. IEEE, 2012. (Year: 2012).*

(Continued)

*Primary Examiner* — Gurkanwaljit Singh
(74) *Attorney, Agent, or Firm* — Banner & Witcoff, Ltd.

(57) ABSTRACT

Systems, methods, apparatuses, and computer-readable media are provided for rules execution testing using live production data. Live production authorization requests may be received at a production computing device. Production authorization decisions may be determined at the production computing device for the live production authorization requests using a set of production rules. The production authorization requests, data used to arrive at the corresponding production authorization decisions, and/or the corresponding authorization decisions may be streamed in real-time to a test device. Test authorization decisions may be determined at the test device for the received live production authorization requests using the received data used to arrive at the production authorization decisions, and using a set of test rules. Production and test authorization decisions may be compared to determine decision differences. One or more user interfaces or reports may be generated for outputting the decision differences.

20 Claims, 16 Drawing Sheets

(51) Int. Cl.
*G06F 16/245* (2019.01)
*G06Q 10/0633* (2023.01)
*G06Q 20/40* (2012.01)

(56) References Cited

U.S. PATENT DOCUMENTS

| | | | |
|---|---|---|---|
| 8,767,947 | B1 | 7/2014 | Ristock et al. |
| 8,924,279 | B2* | 12/2014 | Liu .................... G06Q 20/4016 |
| | | | 705/37 |
| 9,606,903 | B2 | 3/2017 | Murugesan |
| 9,721,116 | B2 | 8/2017 | Driesen et al. |
| 10,134,040 | B2* | 11/2018 | Ding ................. G06Q 20/4016 |
| 2009/0106151 | A1* | 4/2009 | Nelsen .............. G06Q 20/4016 |
| | | | 705/44 |
| 2009/0112654 | A1 | 4/2009 | Neale |
| 2010/0005029 | A1* | 1/2010 | Nelsen ................ G06Q 20/405 |
| | | | 705/76 |
| 2010/0287099 | A1* | 11/2010 | Liu ........................ G06Q 20/40 |
| | | | 235/380 |
| 2012/0278246 | A1* | 11/2012 | Boding .................. G06Q 40/02 |
| | | | 705/317 |
| 2014/0058763 | A1* | 2/2014 | Zizzamia ............... G06Q 10/10 |
| | | | 705/4 |
| 2014/0324699 | A1* | 10/2014 | Ding .................. G06Q 20/4016 |
| | | | 705/44 |
| 2016/0055427 | A1* | 2/2016 | Adjaoute ............... G06N 20/00 |
| | | | 706/12 |
| 2018/0101852 | A1* | 4/2018 | Liu ......................... G06Q 20/40 |
| 2019/0132350 | A1* | 5/2019 | Smith .................... G06F 21/577 |
| 2020/0394659 | A1* | 12/2020 | Qu .......................... G06N 5/003 |

OTHER PUBLICATIONS

Karnouskos, Stamatis, et al. "Real-world service interaction with enterprise systems in dynamic manufacturing environments." Artificial intelligence techniques for networked manufacturing enterprises management (2010): 423-457. (Year: 2010).*

Mittal, Saurabh, José L. Risco-Martín, and Bernard P. Zeigler. "DEVS/SOA: a cross-platform framework for net-centric modeling and simulation in DEVS unified process." Simulation 85.7 (2009): 419-450. (Year: 2009).*

Awedikian, Roy. Quality of the design of test cases for automotive software: design platform and testing process. Diss. Ecole Centrale Paris, 2009. (Year: 2009).*

* cited by examiner

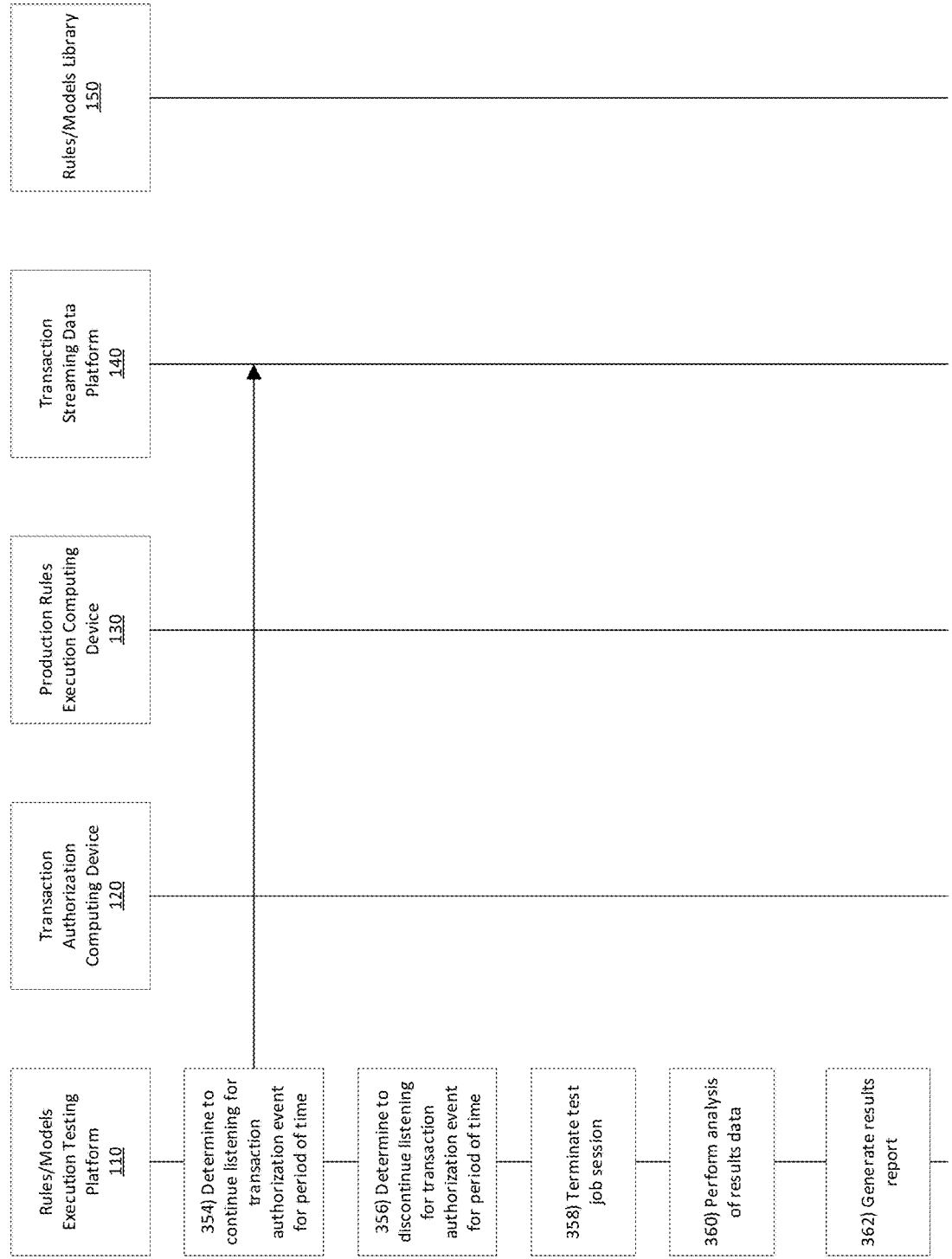

600

Schedule Rules/Model Test Job

Rule Set Type

Rule Set ID

Rule Set Version

Model Type

Model ID

Model Version

Test Job Key

Test Job Num of Authorizations

Test Job Time Period

Test Job Time Period Offset

*Cancel*  *Go*

FIG. 6

View Rules/Models Testing Log

Job Key,Rule Set Type,Rule Set ID,Rule Set Version,Model Type,Model ID,Model Version,Input Auth Details,Prod Model Score,Test Model Score,Prod Decision,Test Decision,Prod Run Time,Test Run Time
1,Fraud,8797,1.2,Fraud,676,3.6,xxxxxxx,85,87,Accept,Decline,0.01,0.02
1,Fraud,8797,1.2,Fraud,676,3.6,xxxxxxx,98,98,Accept,Accept,0.01,0.02
1,Fraud,8797,1.2,Fraud,676,3.6,xxxxxxx,76,76,Accept,Decline,0.01,0.02
1,Fraud,8797,1.2,Fraud,676,3.6,xxxxxxx,87,99,Decline,Accept,0.02,0.01
2,Fraud,234,3.4,Fraud,34,3.7,xxxxxxx,65,65,Accept,Accept,0.01,0.02
2,Fraud,234,3.4,Fraud,34,3.7,xxxxxxx,34,34,Accept,Accept,0.01,0.02
2,Fraud,234,3.4,Fraud,34,3.7,xxxxxxx,74,73,Decline,Decline,0.01,0.02
2,Fraud,234,3.4,Fraud,34,3.7,xxxxxxx,66,42,Decline,Accept,0.02,0.01

*Cancel*

FIG. 7

AUTOMATED RULES EXECUTION TESTING AND RELEASE SYSTEM

RELATED APPLICATIONS

This application is a continuation of U.S. patent application Ser. No. 17/140,774, filed Jan. 4, 2021, whose contents are expressly incorporated by reference herein for all purposes.

FIELD OF USE

Aspects of the disclosure relate generally to computer systems, servers, and devices for improved testing functionality, and in particular to a computing environment for testing automated business rules using live production data.

BACKGROUND

Transaction authorization and other decisioning systems process large quantities of requests, from a variety of sources, for authorization determinations. Such determinations may often be based on complex sets of logic, rules, and procedures, which may be defined by an organization and may be automated in the form of business rules, models, decisioning logic or code, or the like (which terms may be used interchangeably throughout the disclosure), to ensure consistent and efficient application across all authorization determinations. The validity of such business rules may be critical to an organization's ability to make accurate and timely decisions. However, as business requirements change and evolve, so too must the business rules used to make business-critical decisions. Businesses may spend significant time and energy carefully making such changes in a production environment, and making live authorization decisions using new or modified business rules, to ensure that rules are accurate and provide the results that are expected. Because business rules may be critical to decision making processes, organizations generally benefit from being able to quickly—yet thoroughly—test new and changed business rules so that they may be integrated into production as quickly, as safely, and as seamlessly as possible. However, testing new or changed business rules to meet these needs may pose a significant technical challenge. For example, in transaction authorization and other decisioning systems, business rules may be tested in a stand-alone testing or quality assurance (QA) environment that, in some cases, might mimic a production environment by refreshing the testing/QA environment on some periodic or routine basis with historical data from a production environment. Testing in this manner may require significant overhead due to the need for additional computing resources to support the testing/QA environment and the need to download and transform data from production environments to the test/QA environments. Moreover, these testing and QA environments might not provide an accurate representation of a real-time live production environment—particularly because such production systems require personal and customer-sensitive information in order to make accurate authorization determinations. Such personal and sensitive information, however, might require redacting before the data can be used in a testing or QA environment. This circumstance may result in business rules being tested using incomplete information, which in turn may cause the business rules to misfire, not be triggered, or provide inaccurate results during testing. Additionally and/or alternatively, conventional transaction authorization systems and decisioning systems might create a beta environment to test new business rules. In such instances, new business rules may be released to the beta environment, and the beta environment may be exposed to live production traffic in order to test the new business rules. This, however, can pose many significant risks to the organization as live customers, and live authorization determinations may be negatively impacted by any potential negative effects that the new-untested rules may have on processing times, by timeout exceptions or other errors that may be introduced by the rules, and by incorrect authorization determinations that may result from faulty logic in the rules being tested. Moreover, this solution might not provide organizations with an opportunity to compare the results of testing the new business rules with results from the existing business rules for the same set of live production data. Other conventional systems may test business rules by manually creating a large number of test cases and test data that would cause the new or modified business rules to be triggered and tested. This however, may be difficult and time consuming, and requires technical expertise to create the test cases and test data each time a new rule is added or modified. Moreover, this approach to testing may be prone to error due to the manual nature of such an exercise. Accordingly, a solution for safely, efficiently, and seamlessly testing business rules requiring the use of live production data, while minimizing computing costs, is needed.

SUMMARY

The following presents a simplified summary in order to provide a basic understanding of various aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the detailed description below.

Aspects of the disclosure relate to methods, computer-readable media, systems, and apparatuses for testing automated business rules using live production data In accordance with aspects of the disclosure, one or more computing devices, which may be all or portions of a testing system, may receive an indication of one or more new business rules or models to be tested. Upon receiving the indication, the testing system or computing devices may configure a business rules/models test job. The test job may indicate one or more business rules, rulesets, and/or models to test and a period of time for performing the test. After configuring the test job, the testing system or computing devices may listen for transaction authorization events or other decisioning-related events that are streamed, in real-time, from one or more live production systems or devices, via one or more streaming data platforms. Such decisioning-related events may be any number of events in which a decision is required by a requesting device. For example, the events may be related to a request for authorization of a credit card purchase transaction, a request for authorization or approval of a credit card, mortgage, or other application, a request for a determination of treatment of delinquent or charge-off customers, and the like. For convenience of description, such events may be referred to as transaction authorization events throughout. The transaction authorization events streamed from the one or more live production systems or computing devices may comprise, for example, data used to make a live authorization determination and the resulting authorization determination. The testing system or computing devices may retrieve the production authorization event data in real-time, instantiate a business rules/models test session in accordance with the configured test job, and/or may execute, during the test session, the one or more new business rules, rulesets, and/or models using the data used to make the live authorization determination in order to generate a test authorization determination. The test authorization determination may be compared with the received production authorization determination to identify any decision differences. One or more metrics associated with the test job may additionally and/or alternatively be compared with metrics associated with the corresponding production run for additional comparisons. Based on identifying differences exceeding a threshold difference amount, the testing system or computing devices may cause one or more processes to be performed. Based on determining that the differences do not exceed a threshold difference amount, the testing system or computing devices may cause the one or more new business rules and/or models to be automatically released to a production environment using an automated pre-approved release process.

These and other features and advantages of the disclosure will be apparent from the detailed description provided below.

BRIEF DESCRIPTION OF THE DRAWINGS

The present disclosure is described by way of example and is not limited in the accompanying drawings, in which like reference numerals indicate similar elements, and in which:

FIGS. 3A-3F show an example event sequence for performing rules and models testing functions, in accordance with one or more aspects described herein.

FIG. 6 illustrates an example user interface for scheduling testing of one or more rules or models, in accordance with one or more aspects described herein.

FIG. 7 illustrates an example user interface for displaying a rules/models testing log, in accordance with one or more aspects described herein.

DETAILED DESCRIPTION

Figure 1A:
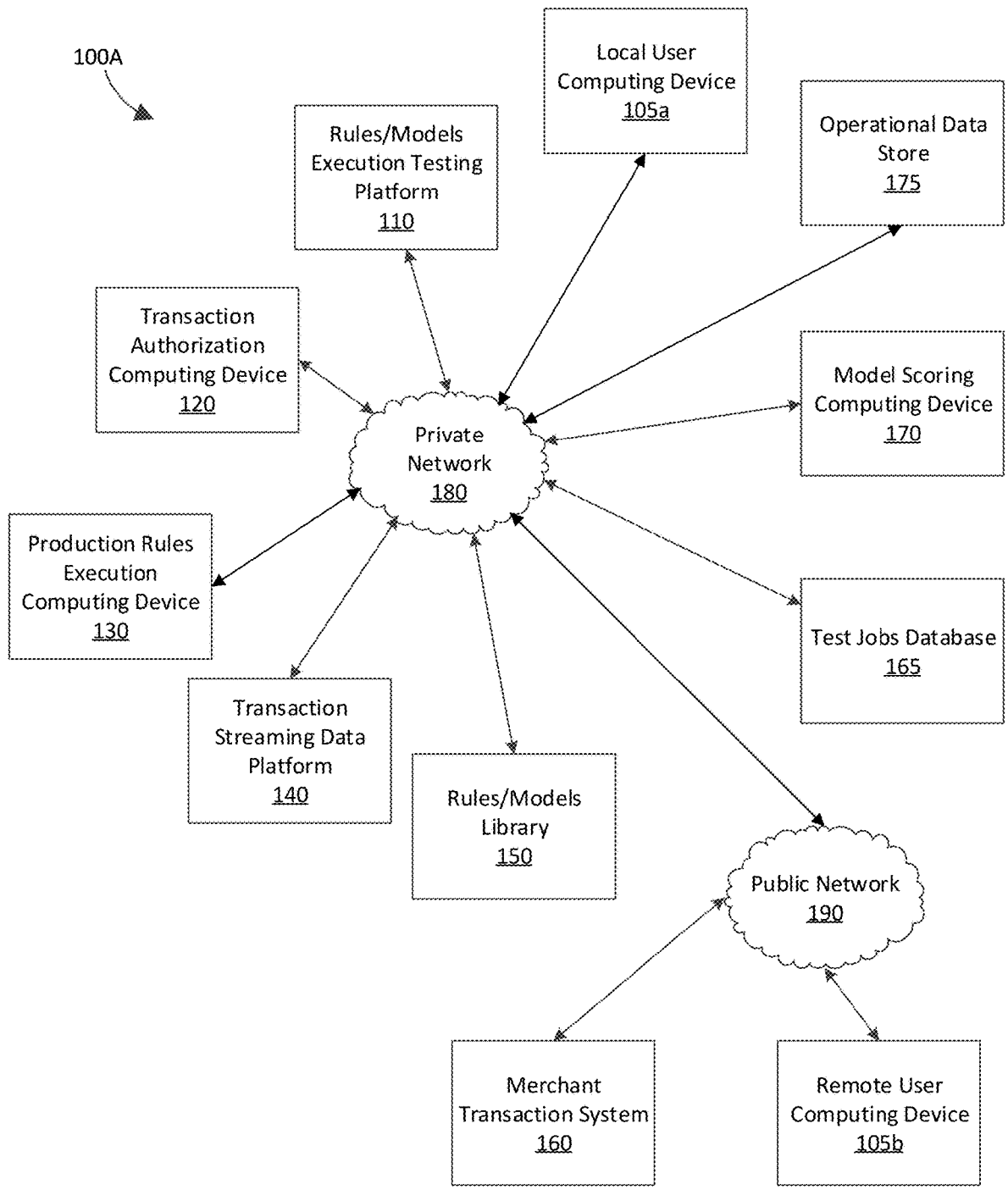
FIGS. 1A and 1B illustrate example computing environments for implementing rules and models testing functions, in accordance with one or more aspects described herein.

In the following description of the various embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods, systems, devices, and computer-readable media for testing business rules, in isolated test environments, using live production data in real-time.

In accordance with aspects of the disclosure, improved systems and devices are provided for testing business rules, models, and/or other decisioning logic or code using live production data. The disclosed systems and devices may overcome the limitations of conventional systems and/or devices by, among other benefits, providing a solution that allows for testing business rules, models, and/or other decisioning logic/code, in real-time, using live production data, and/or performing A/B testing of business rules and/or models using live production data—while shielding live production environments from such testing. This may, among other benefits, eliminate any impact to live production resources and customers, and provide a testing environment that has an accurate representation of data needed to effectively, thoroughly, and safely test new business rules, models, and/or other decisioning logic/code, while at the same time reducing both computing and human technical resource overhead. Accordingly, the technical features disclosed herein may improve the efficiency and speed of such computers and/or decisioning platforms by, for example, minimizing the need to employ additional computing resources and thereby minimizing computing costs. For instance, receiving, in a testing environment that is isolated from production, production authorization determination data from a live production environment in real-time, along with all of the production data used to arrive at the production authorization determination, may allow for business rules, models, and/or other decisioning logic/code to be tested without the need to release the test rules, models, and/or other decisioning logic/code into a production environment and without the need to rerun or recreate, in the test environment, the various processes used in production to arrive at the production determination. Thereby eliminating the need for production rules engines and other applications to be installed and employed in the test environment. As a result, the technical features provided by the systems and devices disclosed herein may contribute to a technical solution that reduces computing costs, improves the speed and efficiency of testing, and better utilizes an organization's computing resources. Moreover, the systems and devices disclosed herein may further improve the functioning of computers and/or decisioning platforms by improving the ability of such computers and/or decisioning platforms to identify and analyze discrepancies between existing production rules, models, and/or other decisioning logic/code and test rules, models, and/or other decisioning logic/code and additionally, the technical impact that introducing new rules, models, and/or other decisioning logic/code will have on production data. Furthermore, the disclosed systems and devices may improve the functioning of computers and/or decisioning platforms by improving the ability for computers and/or decisioning platforms to rapidly, safely, and automatically release thoroughly tested business rules, models, and/or other decisioning logic/code into a production environment.

Figure 1B:
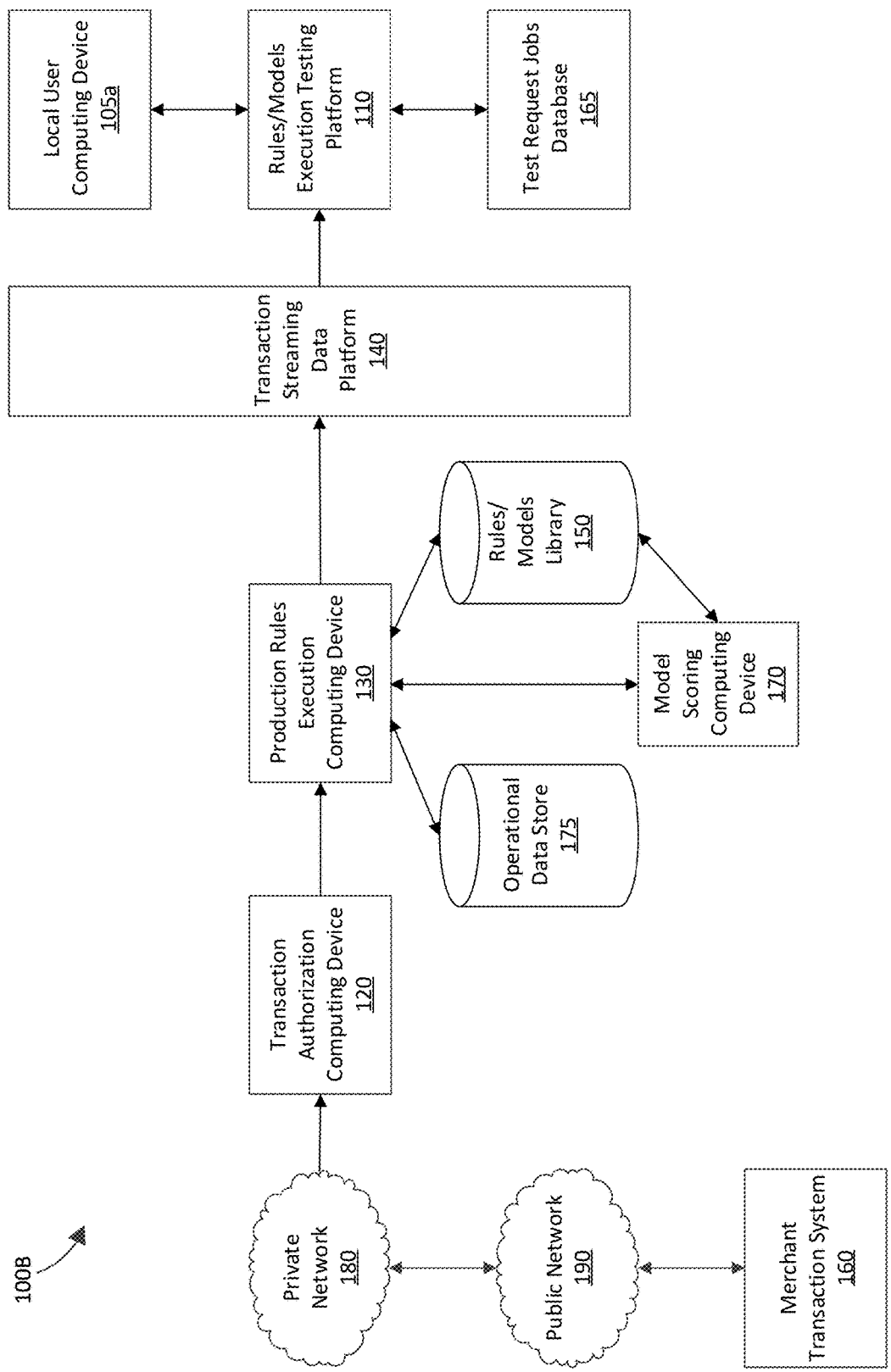

Referring to FIGS. 1A and 1B, example computing environments 100A and 100B are provided. The example computing environment 100A, shown in FIG. 1A, may include one or more systems or computing devices, such as a local user computing device 105a, a remote user computing device 105b, a rules/models execution testing platform 110, a transaction authorization computing device 120, a production rules execution computing device 130, a transaction streaming data platform 140, a rules/models library 150, a merchant transaction system 160, a test jobs database 165, a model scoring computing device 170, an operational data store 175, a private network 180, and a public network 190. Although the various systems and computing devices in the computing environment 100A are shown and described as separate devices, one or more of the computing devices, may be part of a single computing device without departing from the disclosure.

The private network 180 may be a network operated by, and internal to, an organization or business. The private network 180 may be used to interconnect one or more computing devices internal to the organization or business. For instance, referring to the example computing environment 100B shown in FIG. 1B, the private network 180 may interconnect the local user computing device 105a, the rules/models execution testing platform 110, the transaction authorization computing device 120, the production rules execution computing device 130, the transaction streaming data platform 140, the rules/models library 150, the test jobs database 165, the model scoring computing device 170, and the operational data store 175. The private network 180 may further connect to the public network 190. The private network 180 may include one or more of local area networks (LANs), wide area networks (WANs), virtual private networks (VPNs), and the like.

The public network 190 may connect the private network 180, and/or the one or more computing devices connected thereto, to one or more networks, systems, and/or computing devices that may not be associated with the organization, such as the remote user computing device 105b and the merchant transaction system 160. The public network 190 may include one or more networks, such as the Internet.

The merchant transaction system 160 may include one or more computing devices associated with one or more merchant businesses external to the organization or business that operates the private network 180. For instance, the merchant transaction system 160 may be a one or more computing devices of a store merchant. The merchant transaction system 160 may be used by the store merchant when a customer makes a purchase using a credit card. When the customer's credit card is swiped by the store merchant during the purchase transaction, the merchant transaction system 160 may communicate, via the public network 190, with one or more systems or computing devices external to the merchant transaction system 160 to receive an authorization decision for the purchase transaction. In particular, the merchant transaction system 160 may communicate, via the public network 190, with the private network 180, and one or more computing devices connected thereto, to request an authorization decision for the purchase transaction. One or more of the computing devices connected to the private network 180 may execute one or more processes, such as one or more business rules, for determining whether the authorization request should be approved or declined, and may transmit an authorization decision back to the merchant transaction system 160 via the public network 190. Alternatively, the merchant transaction system 160 may be a system for requesting approval of a credit card application or a mortgage application, or a system for requesting a determination related to treatment for a delinquent or charge-off customer, or another such system requiring an authorization, approval, or other decision.

The transaction authorization computing device 120 may be configured to receive one or more transaction authorization requests from the merchant transaction system 160. The transaction authorization computing device 120 may transmit information associated with the transaction authorization request to one or more computing devices for making an authorization determination. For instance, the transaction authorization computing device 120 may transmit information associated with the transaction authorization request to the production rules execution computing device 130 for an authorization determination. The transaction authorization computing device 120 may receive, from the production rules execution computing device 130, an authorization determination for a transaction authorization request. The transaction authorization computing device 120 may transmit the authorization determination back to the merchant transaction system 160.

The rules/models library 150 may be one or more repositories configured to store business rules and/or model algorithms and/or information corresponding to the business rules and/or model algorithms. The business rules and model algorithms may be used for making transaction authorization determinations. The rules/models library 150 may additionally or alternatively comprise one or more tables or files storing information related to the business rules and/or model algorithms, such as an identifier, a version number, a type (e.g., drools, JavaScript Object Notation (JSON), Camunda, iRules, Decision Model and Notation (DMN)), an indication of an environment in which the rule/model algorithm is usable (e.g., test, production, etc.), an indication of a system in which the rule/model is associated with (e.g., fraud, credit, etc.) a storage location of the business rule/algorithm, and the like. The rules/models library 150 may additionally or alternatively comprise one or more tables or files that correlate two or more business rules into business rulesets usable together.

The model scoring computing device 170 may be configured to calculate one or more model scores for a transaction associated with a transaction authorization request. The model score may be used together with additional information in the transaction authorization determination process. The model scoring computing device 170 may use one or more model algorithms to calculate a model score associated with the transaction. The one or more model algorithms may be maintained in the model scoring computing device 170 and/or in the rules/models library 150. In some instances, the model scoring computing device 170 may use a machine learning model and/or one or more machine learning datasets to evaluate transactions and make predictions about the degree of risk associated with the transactions. These predictions may be used in the transaction authorization determination process. The machine learning model used by the model scoring computing device 170 may receive data associated with the transaction, the consumer, and/or the merchant, and using one or more machine learning algorithms, may generate one or more machine learning datasets. Various machine learning algorithms may be used, such as, but not limited to, supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. The machine learning model may analyze data to identify patterns, sequences, relationships, and the like, to generate one or more machine learning datasets.

The machine learning datasets may include datasets linking information associated with a transaction, a consumer, a merchant, or the like (or combinations thereof) to one or more outputs. For instance, the machine learning datasets may link data such as a transaction amount, a transaction date, a transaction type, spending patterns of the consumer, a credit limit for the consumer, an average spend amount for the merchant or the like to outputs, such as risk/fraud determinations and/or model scores. The model score may indicate an overall degree of risk associated with the transaction, the consumer, and/or the merchant associated with the transaction authorization request. The model score may be used together with additional information in the transaction authorization determination process to evaluate the transaction and make predictions about the level of risk associated with the transaction in order to make an authorization determination. The machine learning datasets, used by the model scoring computing device 170, may be updated and/or validated based on later-received data. For instance, as transaction authorizations are determined, as actual transaction fraud determination are made, as additional data associated with the consumer and/or the merchant is collected or received, or the like, the machine learning datasets may be validated and/or updated based in the newly collected or received information. In this way, the machine learning model may be trained to continuously refine and improve its determinations and outputs.

The operational data store 175 may be configured to store features, e.g., historical data about a merchant or consumer account and previous transactions associated therewith. For instance, as a non-limiting example, the features may include average spend amounts for the merchant and/or consumer, spending patterns of the consumer, credit limits, etc. The features may be used together with additional information in the transaction authorization determination process.

The production rules execution computing device 130 may be or comprise one or more rules or decision engines and may be configured to execute one or more business rules to make a transaction authorization determination. The production rules execution device 130 may be a component of the transaction authorization computing device 120, or may be a separate device.

The production rules execution computing device 130 may receive, from the transaction authorization computing device 120, information associated with a transaction authorization request received from the merchant transaction system 160. Upon receiving the transaction authorization request, the production rules execution computing device 130 may retrieve, from the operational data store 175, features data associated with the transaction authorization request and may request the model scoring computing device 170 to calculate and send a model score associated with the transaction authorization request. The production rules execution computing device 130 may access or retrieve one or more business rules stored in the rules/models library 150 and invoke a rules session using the one or more business rules. The transaction authorization request, the features data, and/or the model score may serve as input to one or more business rules executed during the rules session. In executing the one or more business rules, the production rules execution computing device 130 may make an authorization determination and/or may transmit the authorization determination to the transaction authorization computing device 120 to be transmitted back to the merchant transaction system 160. The production rules execution computing device 130 may additionally or alternatively, transmit all of the data used to make the authorization determination (e.g., the transaction authorization request, the features data, and the model score) and the resulting authorization decision to a streaming data platform, such as the transaction streaming data platform 140, for use by one or more devices or systems for real-time analytical, testing, or other purposes. The production rules execution computing device 130 may transmit additional information to the transaction streaming data platform 140 as well, such as, but not limited to, information identifying one or more business rules used during execution of the rules session, one or more model algorithms used, an elapsed time for executing each of the business rules, an elapsed time for calculating the model score, an elapsed time for processing the transaction authorization request, errors encountered, and the like.

The transaction streaming data platform 140 may be one or more computing devices configured to receive data generated by one or more sources, such as data generated by the production rules execution computing device 130. For instance, the transaction streaming data platform 140 may receive data associated with a transaction authorization request as well as a resulting authorization determination. That is, for each authorization request processed by the production rules execution computing device 130, information associated with the transaction authorization request, the features data and the model score used in making the authorization determination, and/or the authorization determination itself may be received by the transaction streaming data platform 140. The transaction streaming data platform 140 may receive additional information associated with the production transaction authorization request, such as, but not limited to, information identifying one or more business rules used during execution of the production rules session, one or more model algorithms used during the production rules session, an elapsed time for executing each of the business rules in production, an elapsed time for calculating the model score in production, an elapsed time for processing the transaction authorization request in production, errors encountered in production, and the like. This data may be streamed or published by the transaction streaming data platform 140, in real-time, and may be used by one or more other computing devices for a variety of purposes, such as for analytics, building learning datasets, testing, etc. In accordance with one or more aspects of this disclosure, the data may be received by the rules/models execution testing platform 110 for real-time testing of business rules using the live production data.

The local user computing device 105a and/or the remote user computing device 105b may be configured to communicate with and/or connect to one or more systems or computing devices of the computing environment 100A via the private network 190 and/or the public network 190. For instance, the local user computing device 105a may be configured to communicate with or connect to one or more of the systems or computing devices of the computing environment 100A via the private network 180. While the remote user mobile computing device 105b may be configured to communicate with or connect to one or more systems or computing devices of the computing environment 100A via the public network 190. The local user computing device 105a and/or the remote user computing device 105b may have stored thereon one or more applications for performing one or more aspects described herein. In particular, the local user computing device 105a and/or the remote user computing device 105b may store an application for outputting one or more user interfaces for: scheduling a new business rules/models test job, viewing or editing a business rules/models test job, deleting, canceling, or interrupting a business rules/models test job, viewing a business rules/models testing log, viewing an aggregated test results report, viewing and customizing one or more test results dashboards; or outputting one or more notifications; and the like. The local user computing device 105a and/or the remote user computing device 105b may be any type of computing device or combination of devices capable of performing the particular functions disclosed herein. For example, the local user computing device 105a and/or the remote user computing device 105b may be and/or include server computers, desktop computers, laptop computers, tablet computers, smart phones, fitness devices, or the like that may include one or more processors, memories, communication interfaces, storage devices, and/or other components. The local user computing device 105a and/or the remote user computing device 105b, in some instances, may be or include special-purpose computing devices configured to perform the functions disclosed herein.

The test jobs database 165 may be a database used to store test job requests for triggering a test job session to be instantiated. In particular, a user may create one or more new business rules or model algorithms and may wish to test the new business rules and/or model algorithms prior to the rules being released in a production environment. The user, in this case, may access an application operating on a computing device (such as the local user computing device 105a, the remote user computing device 105b, or the rules/models execution testing platform 110) to schedule a test job for the new business rules and/or models. The user may provide various details about the test job, via one or more parameters. The parameters may be used to provide, but need not be limited to, identification information for the business rules to be tested, identification information for models to be tested or used during testing of the business rules, the length of time for which to run the test job, the amount of data (e.g., the number of transaction authorization requests) to use for the test job, one or more difference threshold values, etc. The test jobs database 165 may receive, from the rules/models execution testing platform 110, a test job request record comprising information about the test job, including the various parameter values, to be inserted into the test jobs database 165. A record for each test job request may be inserted into the test jobs database 165. Additional information may be included in the test job request record such as, but not limited to, a timestamp of receipt of the record, information identifying a sending source, a status of the request (e.g., pending, closed, interrupted, etc.), and the like. When the test job request record is detected in the test jobs database 165, by the rules/models execution testing platform 110, a test job session may be configured and instantiated by the rules/models execution testing platform 110 in accordance with the information stored in the test jobs database 165.

The rules/models execution testing platform 110 may be one or more computing devices configured to provide various functions for testing business rules and/or models using live production data. The rules/models execution testing platform 110 may receive a request to schedule, view, edit, delete, or interrupt a business rules/models test job. For instance, as mentioned above, a user may create and wish to test the one or more business rules or models prior to the rules being released in a production environment. The user may access an application operating on the local user computing device 105a, the remote user computing device 105b, or the rules/models execution testing platform 110 to schedule a test job for the new business rules or models. As previously described, the user may provide details about the test job, via one or more parameters. The parameters may be used to provide, but need not be limited to: identification information for the business rules to be tested, identification information for models to be tested or used during testing of the business rules or models, the length of time for which to run the test job, the amount of data (e.g., transaction authorization requests) to use for the test job, one or more difference threshold values, etc. The rules/models execution testing platform 110 may generate a test job request record comprising information about the test job and including information associated with the various parameters. The rules/models execution testing platform 110 may send the test job request record to a queue or a database, such as the test jobs database 165, to be inserted therein. Upon detecting the job request record in the test jobs database 165, the rules/models execution testing platform 110 may configure and instantiate a new test job session in accordance with the information provided by the parameters. The rules/models execution testing platform 110 may further retrieve or access, from the rules/models library 150 or other storage location, the one or more business rules and one or more model algorithms specified in parameters. The test job session may be configured to run for a period of time as specified in the parameters or for a number of transaction authorization requests as specified in the parameters.

After configuring and instantiating the test job session, the rules/models execution testing platform 110 may listen for real-time transaction authorization events streamed via the transaction streaming data platform 140. The rules/models execution testing platform 110 may alternatively or additionally listen to/receive historical data from the transaction streaming data platform 140 in accordance with the corresponding configured test job. Upon detecting a transaction authorization event, the rules/models execution testing platform 110 may instantiate a new rules test session for executing the business rules specified in the corresponding configured test job, and may consume the detected transaction authorization event. In particular, after, during, or before instantiating the rules test session, the rules/models execution testing platform 110 may receive or retrieve, from the transaction streaming data platform 140, live production data associated with a transaction authorization request as well as a production authorization decision associated with the transaction authorization request. For instance, the rules/models execution testing platform 110 may receive, from the transaction streaming data platform 140, the transaction authorization input information sent from the merchant transaction system 160 to the transaction authorization computing device 120, the features data retrieved by the production rules execution computing device 130 from the operational data store 175, the model score calculated by the model scoring computing device 170, and the authorization decision determined by the production rules execution computing device 130. The production transaction authorization input information, the features data, and/or the production model score may be used as input to the business rules being tested. Alternatively, prior to executing the business rules, the rules/models execution testing platform 110 may calculate a test model score using a model algorithm specified in the corresponding configured test job. In this case, the test model score may be used as input to the business rules being tested, instead of the production model score. In executing the business rules, the rules/models execution testing platform 110 may determine a test authorization decision using the live production data. When the rules test session has completed execution of the business rules, the rules test session may be terminated.

The rules/models execution testing platform 110 may log the information received from the transaction streaming data platform 140, such as the production transaction authorization input information, the features data, the production model score, the production authorization decision, the test model score, and/or the test authorization decision. The rules/models execution testing platform 110 may log additional information such as, but not limited to, an elapsed amount of time to execute the business rules in production, an elapsed amount of time to calculate the model score in production, any warnings or errors encountered in production, an elapsed amount of time to execute the business rules in test, an elapsed amount of time to calculate the model score in test, any warnings or errors encountered in test, and the like. Information identifying the test job (e.g., a test job key) and the configuration of the test job, the business rules and the models used in both production and test, and the like may additionally be included in the log. The rules/models execution testing platform 110 may output the information to the log during the rules test session or after the test session has completed.

After logging the rules test session, the rules/models execution testing platform 110 may determine whether to continue listening for transaction authorization events from the transaction streaming data platform 140. The rules/models execution testing platform 110 may determine whether to continue listening based on determining whether a time for running the test job has expired based on the length of time or the number of transaction authorizations to test for as specified in the test job configuration.

If the time for running the test job has not expired, the rules/models execution testing platform 110 may continue to listen for transaction authorization events streamed from the transaction streaming data platform 140.

If the time for running the test job has expired, the rules/models execution testing platform 110 may discontinue listening for transaction authorization events and may terminate the test job session. After terminating the test job session, results from the test job may be aggregated and analyzed. For instance, the rules/models execution testing platform 110 may total the number of transaction authorization requests received during a given test job session. The rules/models execution testing platform 110 may further determine a total number of authorization decisions that were the same between production and test, and a total number of authorization decisions that were different between production and test. The rules/models execution testing platform 110 may make such determinations on a rule-by-rule basis. That is, the rules/models execution testing platform 110 may identify each rule triggered during the test job session and the corresponding rules triggered in the live production environment for the same set of transaction authorization requests and determine, for each rule, the number of matching and mismatching decisions between test and production. The rules/models execution testing platform 110 may analyze the results from the test job data to determine other metrics as well—such as, but not limited to, an average latency for processing a transaction authorization request or executing one or more of the rules in test and in production; the number of transaction authorizations requests processed over a period of time in test and in production; an average number of transaction authorization requests processed for a unit of time (e.g., per second, per minute, etc.) in test and in production; a number of timeout exceptions in test and in production; etc. The analysis of such metrics may be used, by the rules/models execution testing platform 110, to make automatic determinations regarding whether one or more testing parameters should be adjusted and/or whether the test rules and/or models may be released to production.

The rules/models execution testing platform 110 may further analyze one or more model scores calculated in test with corresponding model scores calculated in production. The rules/models execution testing platform 110 may further identify the number of matching model scores, the number of mismatching model scores, latency in calculating the model score in test and in production, etc.

The rules/models execution testing platform 110 may generate one or more reports based on the aggregated and analyzed data. The rules/models execution testing platform 110 may output the one or more reports to a display associated with the rules/models execution testing platform 110 or may transmit the one or more reports to another computing device, such as to the local user computing device 105a or the remote user computing device 105b. The rules/models execution testing platform 110 may further generate one or more user interfaces based on the aggregated and analyzed test results. The rules/models execution testing platform 110 may output the one or more user interfaces to a display of the rules/models execution testing platform 110 or to another computing device, such as the local user computing device 105a or the remote user computing device 105b. The generated user interface may be similar to user interface 800 shown in FIG. 8. The rules/models execution testing platform 110 may provide tools that allow a user to customize the user interface. The rules/models execution testing platform 110 may allow drilling down from the aggregated data into more granular data related to the test job session and may output a user interface that displays the more granular data. For instance, the rules/models execution testing platform 110 may output data from the rules/models testing log in a user interface similar to user interface 700 shown in FIG. 7.

If the rules/models execution testing platform 110 determines that one or more of the aggregated results exceeds a difference threshold (for example, if there are more than a threshold amount of transaction authorization decision differences between test and production, if an average latency for processing the transaction authorization requests or executing the business rules differs between test and production by more than a threshold amount, if there are more than a threshold amount of model score differences between test and production, or the like), the rules/models execution testing platform 110 may cause one or more processes to be executed. The one or more processes may include, but need not be limited to: outputting a notification about the differences to a display associated with the rules/models execution testing platform 110; transmitting a notification about the differences to a computing device, such as the local user computing device 105a or the remote user computing device 105b; determining one or more parameters values to adjust for a subsequent test job session and automatically adjusting the determined parameter values accordingly; identifying one or more rules and/or model algorithms attributable to a threshold percentage of the differences; determining differences between the identified one or more rules and/or model algorithms, and outputting information (or transmitting a notification to a computing device, such as the local user computing device 105a or the remote user computing device 105b, associated with a user) about the determined differences; etc.

On the other hand, if the rules/models execution testing platform 110 determines that the aggregated results do not exceed a difference threshold, the rules/models execution testing platform 110 may cause the corresponding rules and/or models to be released to a production environment. The rules/models execution testing platform 110 may release one or more rules and/or models to production by transmitting the rules and/or models to a database or library, such as the rules/model library 150, that stores business rules and models for use in production. In some instances, where the business rule or the model may already be stored in the rules/library 150 as a test rule or model, the rules/models execution testing platform 110 may cause a version number, or another identifier for identifying the business rule or model as a production rule or model, to be updated. The rules/models execution testing platform 110 may transmit, to a computing device (such as the local user computing device 105a or the remote user computing device 105b), information notifying of the release to production.

Figure 2A:
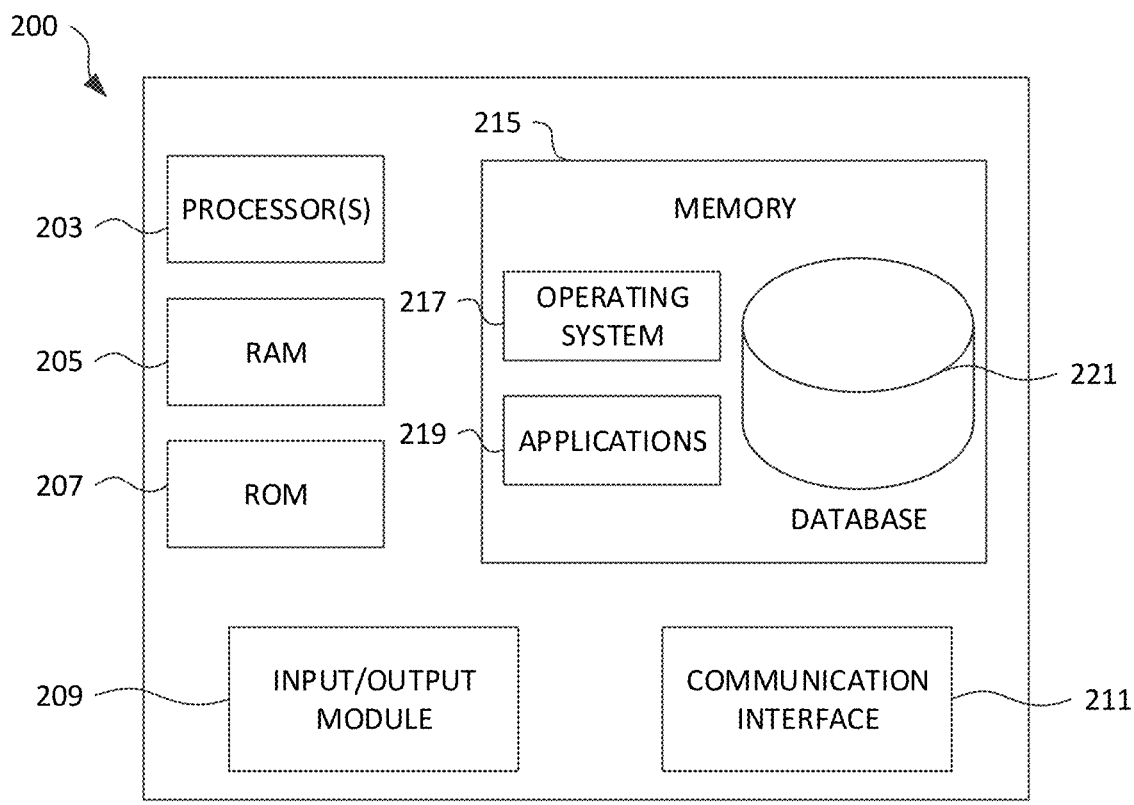
FIG. 2A illustrates an example computing device, in accordance with one or more aspects described herein.

Referring to FIG. 2A, an example computing device 200 is provided. The example computing device 200 may include or incorporate any one of the local user computing device 105a, the remote user computing device 105b, the rules/models execution testing platform 110, the transaction authorization computing device 120, the production rules execution computing device 130, the transaction streaming data platform 140, the rules/models library 150, the merchant transaction system 160, the test jobs database 165, the model scoring computing device 170, and the operational data store 175. In some embodiments, the computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

The computing device 200 may include one or more components, such as one or more processors 203, a random access memory (RAM) 205, a read-only memory (ROM) 207, an input/output (I/O) device 209, a communication interface 211, and a memory 215. The computing device 200 may include one or more additional or different components.

The one or more processors 203 may be configured to control overall operation of the computing device 200 and its associated components. A data bus (not shown) may interconnect the one or more processors 203, the RAM 205, the ROM 207, the memory 215, the I/O device 209, and/or the communication interface 211. The one or more processors 203 may include a single central processing unit (CPU), which may be a single-core or multi-core processor, or may include multiple CPUs. The one or more processors 203 and associated components may control the computing device 200 to execute a series of computer-readable instructions to perform some or all of the processes disclosed herein. Although not shown in FIG. 2, various elements within the memory 215 or other components in the computing device 200, may include one or more caches, for example, CPU caches used by the one or more processors 203, page caches used by the operating system 217, disk caches of a hard drive, and/or database caches used to cache content from database 221. For embodiments including a CPU cache, the CPU cache may be used by one or more processors 203 to reduce memory latency and access time. The one or more processors 203 may retrieve data from or write data to the CPU cache rather than reading/writing to the memory 215, which may improve the speed of these operations. In some examples, a database cache may be created in which certain data from the database 221 may be cached in a separate smaller database in a memory separate from the database 221, such as in the RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

The I/O device 209 may include, but need not be limited to, a microphone, keypad, touch screen, and/or stylus, through which a user of the computing device 200 may provide input, and may also include one or more of a speaker for providing audio output, and a video display device for providing textual, audiovisual, and/or graphical output.

The memory 215 may store software to provide instructions to one or more processors 203 allowing the computing device 200 to perform various actions. For example, the memory 215 may store software used by the computing device 200, such as the operating system 217, application programs 219, and/or the database 221. The various hardware memory units in the memory 215 may include volatile and nonvolatile, removable and non-removable media implemented in any method or technology for storage of information, such as computer-readable instructions, data structures, program modules, or other data. The memory 215 may include one or more physical persistent memory devices and/or one or more non-persistent memory devices. The memory 215 may include, but need not be limited to, the RAM 205, the ROM 207, electronically erasable programmable read only memory (EEPROM), flash memory, or other memory technology, optical disk storage, magnetic cassettes, magnetic tape, magnetic disk storage or other magnetic storage devices, or any other medium that may be used to store the desired information and that may be accessed by the one or more processors 203.

The communication interface 211 may include one or more transceivers, digital signal processors, and/or additional circuitry and software for communicating via any network (e.g., the private network 180, the public network 190, or the like), wired or wireless, using any protocol as described herein.

Although various components of the computing device 200 are described separately, functionality of the various components may be combined and/or performed by a single component and/or multiple computing devices in communication without departing from the disclosure.

Figure 2B:
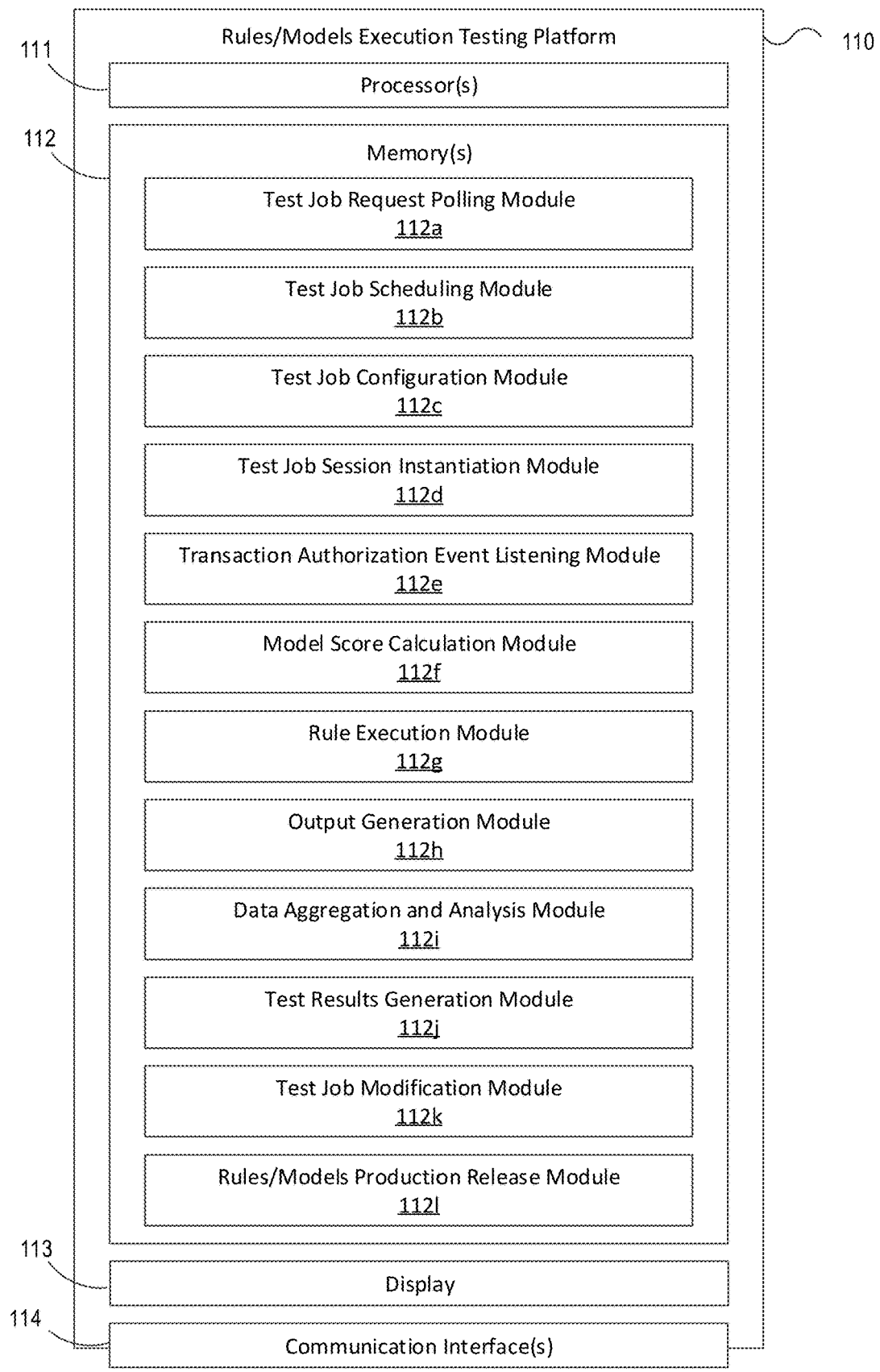
FIG. 2B illustrates an example computing device for performing rules and models testing functions, in accordance with one or more aspects described herein.

Referring to FIG. 2B, an example computing device, such as the rules/models execution testing platform 110, for performing rules and models testing functions is provided. The rules/models execution testing platform 110, may include one or more processors 111, memory 112, a display 113, and one or more communication interfaces 114. A data bus (not shown) may interconnect the one or more processor 111, the memory 112, the display 113, and the one or more communication interfaces 114.

The one or more processors 111 may be similar to the one or more processor 203 of the computing device 200. The one or more processors 111 may be configured to control overall operation of the rules/models execution testing platform 110 and its associated components.

The one or more communication interfaces 114 may be similar to the communication interface 211 of computing device 200. The one or more communication interfaces 114 may be one or more network interfaces configured to support communication between the rules/models execution testing platform 110 and one or more networks (e.g., the private network 180, the public network 190, or the like).

The memory 112 may be similar to the memory 215 of computing device 200. The memory 112 may include one or more program modules having instructions that when executed by one or more processors 111 cause the rules/models execution testing platform 110 to perform one or more functions described herein and/or may include one or more databases that may store and/or otherwise maintain information which may be used by such program modules and/or the one or more processors 111. In some instances, the one or more program modules and/or databases may be stored by and/or maintained in different memory units of the rules/models execution testing platform 110 and/or by different computing devices that may form and/or otherwise make up the rules/models execution testing platform 110.

The one or more program modules included in the memory 112 may comprise one or more of a test job request polling module 112a, a test job scheduling module 112b, a test job configuration module 112c, a test job session instantiation module 112d, transaction authorization event listening module 112e, a model score calculation module 112f, a rule execution module 112g, an output generation module 112h, a data aggregation and analysis module 112i, a test results interface generation module 112j, a test job modification module 112k, or a rules/models production release module 112l. Each of the one or more program modules may store instructions and/or data, that when executed by the one or more processors 111, may cause the rules/models execution testing platform 110 to perform the various functions described below with reference to FIGS. 3A-3F.

FIGS. 3A-3F provide an example event sequence for performing various rules and models testing functions, in accordance with one or more aspects described herein. The sequence shown is merely one example of a sequence of events in accordance with one or more aspects described herein and the order of the events may be modified, additional events may be included, and some events may be omitted, without departing from the scope of the disclosure. Although the various computing devices shown in FIGS. 3A-3F are shown and described as separate devices, one or more of the computing devices, may be part of a single computing device without departing from the disclosure.

Figure 3A:
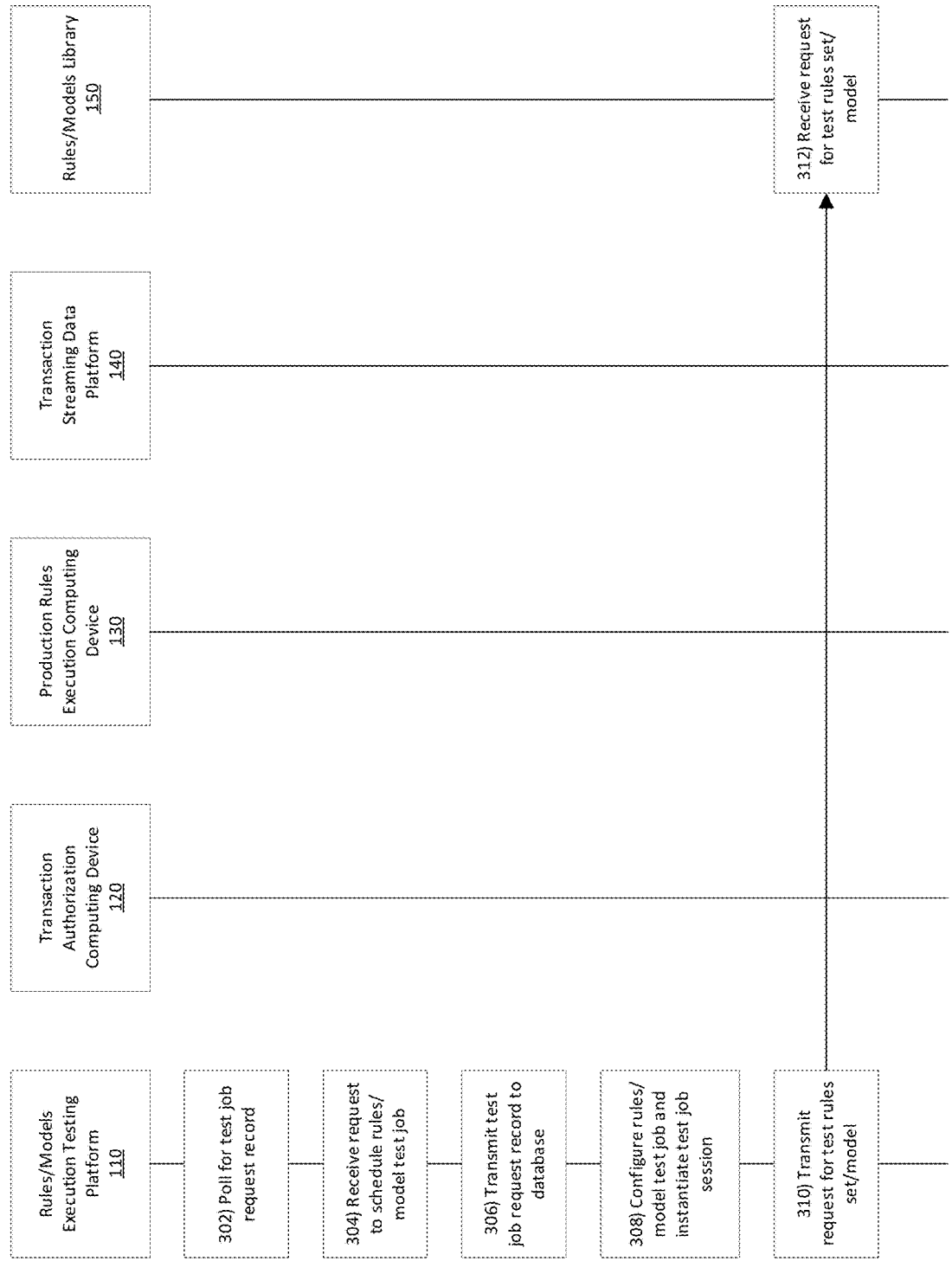
Figure 3B:
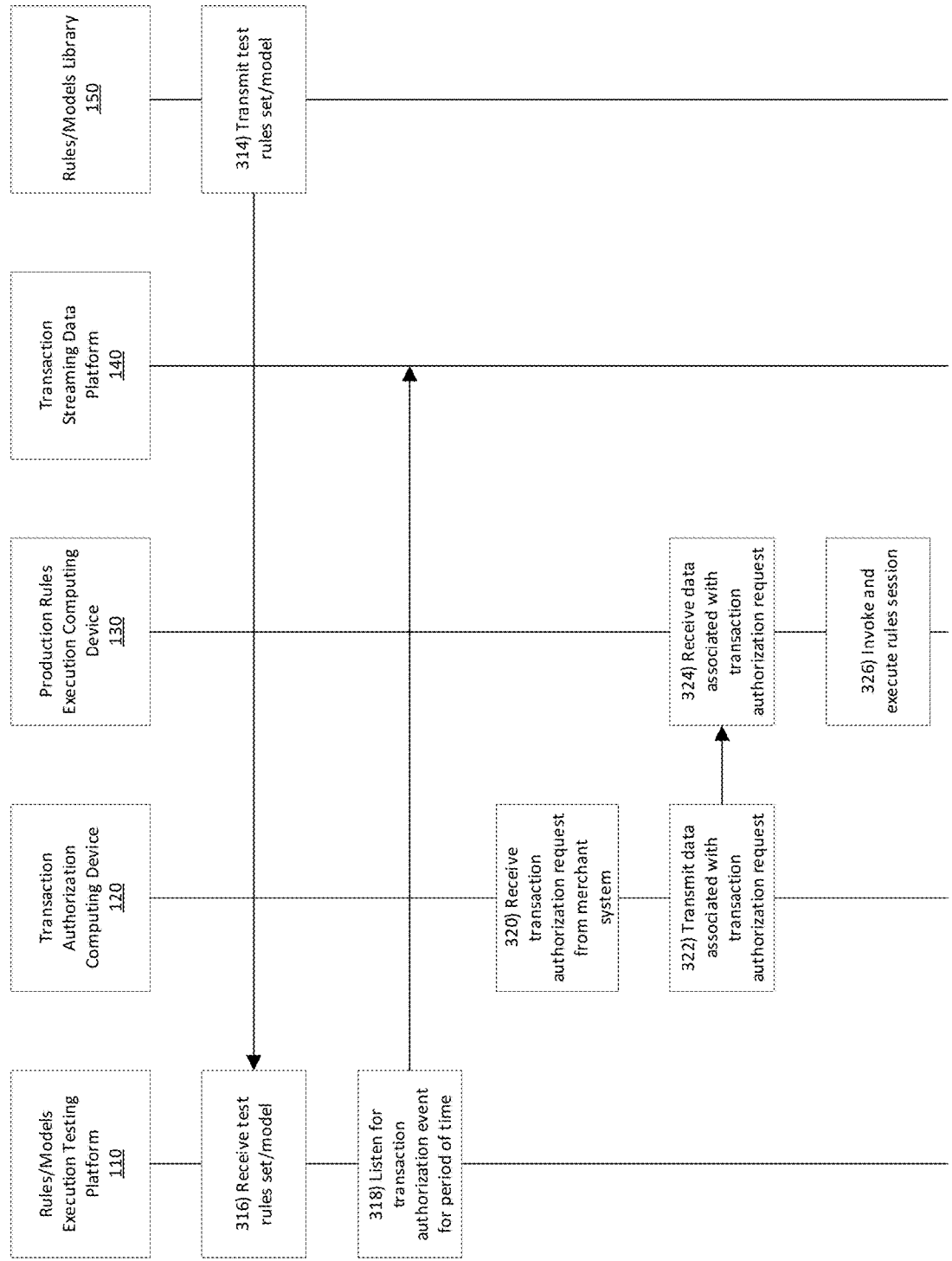

Referring to FIG. 3A, at step 302, the test job request polling module 112a may cause or enable the rules/models execution testing platform 110 to poll the test jobs database 165 for one or more test job request records. The test job request polling module 112b may cause or enable the rules/models execution testing platform 110 to poll the test jobs database 165 on a periodic basis. For instance, every 5 seconds, every 10 seconds, etc. Additionally or alternatively, the test job request polling module 112b may cause or enable the rules/models execution testing platform 110 to poll the test jobs database 165 at different intervals or at aperiodic intervals without departing from the scope of the disclosure. After detecting a test job request record in the test jobs database 165, the rules/models execution testing platform 110 may proceed to step 308.

Meanwhile, at step 304, the test job scheduling module 112b may cause or enable the rules/models execution testing platform 110 to receive a request to schedule a test job. A request may be received to schedule the testing of new business rules and/or model algorithms prior to the rules and/or models being released in a production environment. An application operating on a computing device (such as the local user computing device 105a, the remote user computing device 105b, or the rules/models execution testing platform 110) may be accessed by a user to schedule a test job for new business rules and/or models. For instance, the test job scheduling module 112b may cause or enable the rules/models execution testing platform 110 to display, on the display 113, a user interface, such as example user interface 600, shown in FIG. 6, that may allow a user to schedule a test job, and the test job scheduling module 112b may cause or enable the rules/models execution testing platform to schedule the test job. The user may use the user interface, e.g., the user interface 600, to provide various details about the test job, via one or more parameters. Test job parameters may include, but need not be limited to, a Rule Set Type for identifying a type of rule to be tested; a Rule Set ID for identifying a particular rule or set of rules to be tested; a Rule Set Version for identifying a version of the rule or set of rules to be tested; a Model Type for identifying a type of model to be tested; a Model ID for identifying a particular model or model algorithm to be tested; a Model Version for identifying a version of the model or model algorithm to be tested; a Test Job Key for uniquely identifying the test job to be executed; Test Job Num. of Authorizations for identifying a number of authorizations to run the test job for; a Test Job Time Period for identifying a length of time to run the test job for; and a Test Job Time Period Offset to identify a period of time prior to the time of the test run to retrieve data to use during the test job (e.g., to allow for the use stored historical data with the live data by indicating how far back in time (e.g., 1 day, 5 days, 10 hours, etc.) to retrieve transaction authorization requests during the test job. This may be useful for providing a more significant read on the data to be tested particularly where live real-time production requests are low). Additional parameters may be provided, for example, to identify a particular rules engine to use during testing (e.g., production rules execution computing device 130)—as different types of rules may require different rules engines; to identify one or more sources from which to receive the live production data (e.g., transaction stream data platform 140); to identify a time to begin the test job; to identify a user to be notified about the test job or results; and the like. The parameters may additionally include one or more difference threshold values used to analyze differences between metrics from results of the test job and the corresponding production job and, based on determining whether the difference thresholds have been met, to trigger one or more processes to be executed, such as automatically releasing test rules and/or model algorithms to a production environment; transmitting a notification to a computing device associated with a user; determining and automatically adjusting one or more parameters values for subsequent test job sessions; identifying one or more rules and/or model algorithms attributable differences, determining the differences between the identified one or more rules and/or model algorithms, and outputting information about the determined differences; etc. Values for one or more of the parameters may be automatically selected based on one or more of the other parameter values, user preferences, authorization information, configuration information, or the like.

While a test job may be scheduled using a user interface, such as user interface 600 shown in FIG. 6 and described above, additionally or alternatively, an application program interface (API) may be used to invoke the test job scheduling module 112b to schedule the test job. For instance, the API may be called via a command line interface (CLI) or by an application. The API may receive as input the one or more test job parameter values described above. In other instances, a collaborative platform, such as GitHub, may be used during the business rules development process. In such cases, during the development process, the rules may be maintained in a shared data repository for collaboration between multiple developers. A call to a test job scheduling script may be embedded in comments shared using one or more collaboration tools (e.g., comments in a GitHub pull request). The test job scheduling script may be configured to trigger the API to schedule a test job via the test job scheduling module 112b. The call to the test job scheduling script may include one or more of the above mentioned test job parameters. For example, the call to the test job scheduling script may include a Rule Set ID for identifying a particular rule or set of rules to be tested; a Rule Set Version for identifying a version of the rule or set of rules to be tested; a Test Job Time Period for identifying a length of time to run the test job for; a Test Job Time Period Offset to identify a period of time prior to the time of the test run to retrieve data to use during the test job, etc. The rules/models execution testing platform 110 may be configured to monitor the one or more collaborative tools for such comments and when found, may parse the comments to identify valid calls to the test job scheduling script. When a valid call is identified the rules/models execution testing platform 110 may compile the development business rules maintained in the shared data repository and load the compiled business rules into the rules/models library 150 for availability for testing. The rules/models execution testing platform 110 may execute the test job scheduling script in accordance with the provided parameters to schedule a test job.

At step 306, in response to receiving the request to schedule the test job, the test job scheduling module 112b may cause or enable the rules/models execution testing platform 110 to generate a test job request record and to transmit the record to test jobs database 165 via the one or more communication interfaces 114. The test job request record may be generated by an API that interfaces with the user interface used the schedule the test job and the test jobs database 165. The API may be the same API described above for scheduling the test job. The test job request record may include, but need not be limited to, some or all of the parameter values specified during the request to schedule the test job.

At step 308, the test job request polling module 112a, during polling of the test jobs database 165 (at step 302), may cause or enable the rules/models execution testing platform 110 to detect one or more test job request records in the test jobs database 165. Upon detecting a test job request record in the test jobs database 165, the test job configuration module 112c may cause or enable the rules/models execution testing platform 110 to parse the parameters identified in the test job request record and configure a new test job in accordance with the parameter information. For instance, the test job may be configured to run for a time period specified in the parameter information, to use a ruleset specified in the parameter information, to use a model algorithm specified in the parameter information, to access a specific streaming data platform for the live production data as specified in the parameter information, to use a specific rules engine to execute the one or more rules or rulesets, etc. After the test job is configured, the test job session instantiation module 112d may cause or enable the rules/models execution testing platform 110 to instantiate a new test job session for the test job. Instantiating a test job session may involve creating a new infrastructure instance for the test job session. This may involve allocating one or more computing resources for the test job session, such as, but not limited to, memory resources, CPU resources, storage resources, networking resources, software/hardware resources, cloud resources, virtual machines, and the like. To avoid the unnecessary allocation of resources—which may be wasteful and costly—an on-demand infrastructure approach may be used. For example, instead of allocating a pre-configured amount of infrastructures or resources for anticipated test job sessions, the test job session instantiation module 112d may cause or enable the rules/modules execution testing platform 110 to dynamically create new infrastructure instances and allocate computing resources for test job sessions as test job requests are received and the corresponding test jobs configured. When the test job session has ended, the test job session instantiation module 112d may cause or enable the rules/modules execution testing platform 110 to terminate or shut down the corresponding instance and to release the allocated computing resources. This may allow multiple test jobs sessions to execute simultaneously, while providing an improved utilization of computing resources and while reducing costs associated with supporting infrastructure and computing resources when test job sessions are not executing. Accordingly, test job session instantiation module 112d may cause or enable the rules/models execution testing platform 110 to dynamically instantiate a new test job session for each pending test job request in the test jobs database 165.

At step 310, the test job configuration module 112c may further cause or enable the rules/models execution testing platform 110 to transmit a request, to the rules/models library 150 via the one or more communication interfaces 114, for one or more test rules or rulesets specified in the test job request record and/or for one or more models or model algorithms specified therein. The request may include information identifying the one or more test rules or rulesets, such as an identifier, a version number, and the like.

At step 312, the rules/models library 150 may receive the request for the one or more test rules or rulesets and/or one or more models or model algorithms transmitted from the rules/models testing platform 110. The request may be received via a communication interface (e.g., the communication interface 211) of the rules/models library 150. The rules/modules library 150 may query one or more databases, tables, file structures, etc. to identify and retrieve the requested one or more test rules or rulesets, and referring to FIG. 3B, at step 314, may transmit the one or more test rules or rulesets to the rules/models execution testing platform 110. The one or more test rules or rulesets may be transmitted via a communication interface (e.g., the communication interface 211) of the rules/models library 150.

At step 316, the test job configuration module 112c may cause or enable the rules/models execution testing platform 110 to receive, via the one or more communication interfaces 114, the test rules/model transmitted from the rules/models library 150.

At step 318, the transaction authorization event listening module 112e may cause or enable the rules/models execution testing platform 110 to begin to listen for a transaction authorization event from the transaction streaming data platform 140. The transaction authorization event listening module 112e may cause or enable the rules/models execution testing platform 110 to listen for a period of time or a number of authorization transactions specified in the configured test job.

Meanwhile, at step 320, the transaction authorization computing device 120 may receive a transaction authorization request transmitted from the merchant transaction system 160. The transaction authorization request may be received via a communication interface (e.g., the communication interface 211) of the transaction authorization computing device 120.

At step 322, the transaction authorization computing device 120 may transmit information associated with the transaction authorization request to the production rules execution computing device 130 for an authorization decision. The information associated with the transaction authorization request may be transmitted via a communication interface (e.g., the communication interface 211) of the transaction authorization computing device 120.

At step 324, the production rules execution computing device 130 may receive the information associated with the transaction authorization request transmitted from the transaction authorization computing device 120. The information associated with the transaction authorization request may be received via a communication interface (e.g., the communication interface 211) of the production rules execution computing device 130. The production rules execution computing device 130 may retrieve or receive additional information for making the authorization decision. For instance, the production rules execution computing device 130 may retrieve, from the operational data store 175, features data associated with the transaction authorization request and may request the model scoring computing device 170 to calculate a model score associated with the transaction authorization request. The production rules execution computing device 130 may access or retrieve one or more business rules stored in the rules/models library 150 and invoke a production rules session using the one or more business rules.

At step 326, the production rules execution computing device 130 may invoke and execute a production rules session. The transaction authorization request information, the features, and the model score may serve as input to one or more business rules executed during the production rules session. In executing the one or more business rules during the production rules session, the production rules execution computing device 130 may make an authorization determination.

Figure 3C:
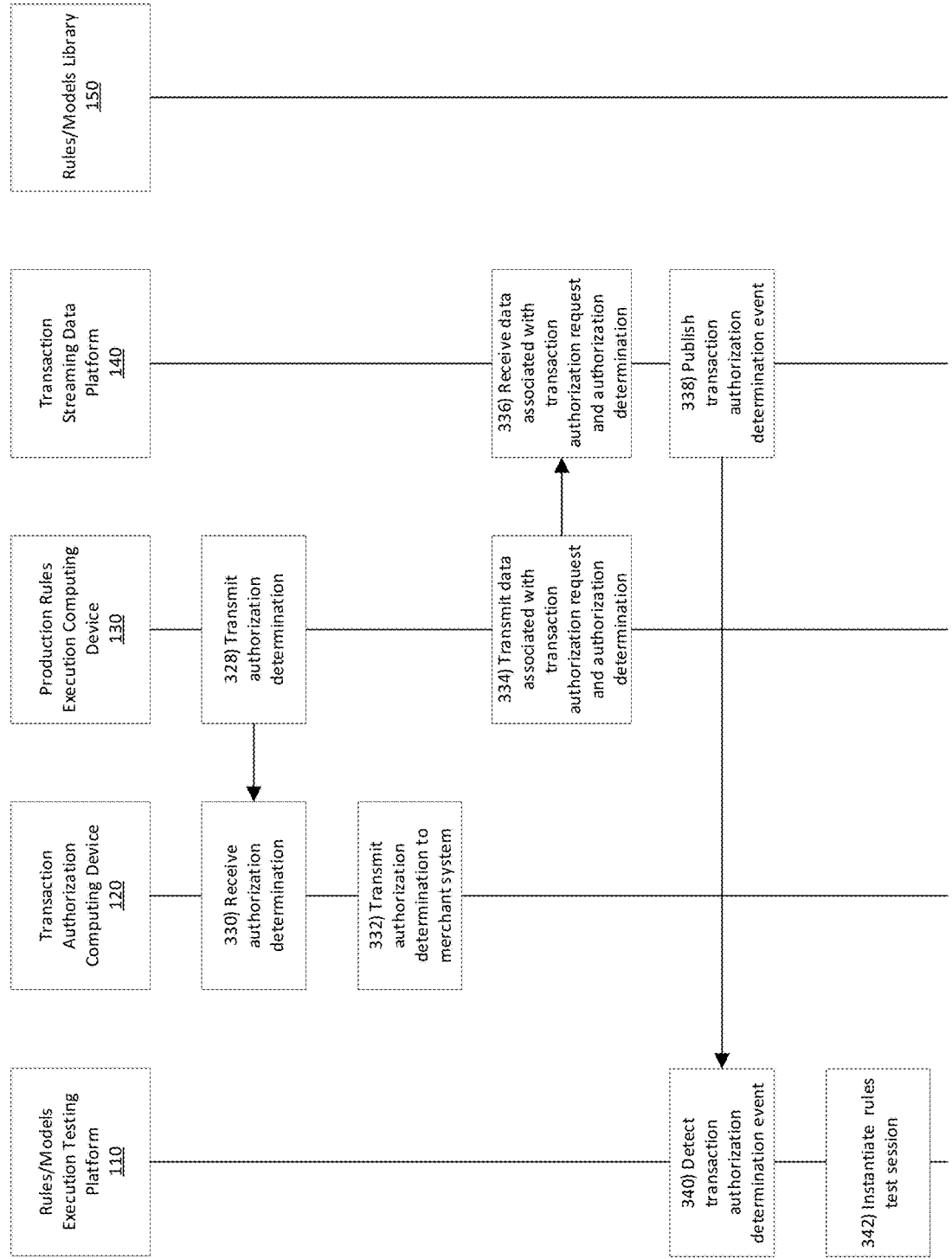

Referring to FIG. 3C, at step 328, the production rules execution computing device 130 may transmit the authorization determination to the transaction authorization computing device 120. The authorization determination may be transmitted via a communication interface (e.g., the communication interface 211) of the production rules execution computing device 130.

At step 330, the transaction authorization computing device 120 may receive the authorization determination transmitted from the production rules execution computing device 130 and, at step 332, may transmit the authorization determination to the merchant transaction system 160. The authorization determination may be received and transmitted via a communication interface (e.g., the communication interface 211) of the transaction authorization computing device 120.

At step 334, the production rules execution computing device 130 may additionally transmit the data used to make the production authorization determination for the transaction authorization request (e.g., the transaction authorization request information received from the transaction authorization computing device 120, the features, and the model score) and the resulting authorization decision to the transaction streaming data platform 140 via a communication interface (e.g., the communication interface 211). Step 334 may be performed before, after, or simultaneously with step 328. The production rules execution computing device 130 may transmit additional information to the transaction streaming data platform 140 as well, such as, but not limited to, information identifying one or more rules used during execution of the rules session, one or more model algorithms used, a time for executing each of the business rules, a time for calculating the model score, a time for processing the transaction authorization request, errors encountered, and the like. The data used to make the production authorization determination, the resulting authorization decision, and the additional information may be transmitted via a communication interface (e.g., the communication interface 211) of the production rules execution computing device 130.

At step 336, the transaction streaming data platform 140 may receive, from the production rules execution computing device 130, the data used to make the production authorization determination for the transaction authorization request (e.g., the transaction authorization request information received from the transaction authorization computing device 120, the features, and the model score), the resulting authorization decision, and any additional information. The data used to make the production authorization determination, the resulting authorization decision, and the additional information may be received via a communication interface (e.g., the communication interface 211) of the transaction streaming data platform 140.

At step 338, the transaction streaming data platform 140 may stream or otherwise publish, the data received from the production rules executing computing device 130, for use by one or more devices or systems for real-time analytical, testing, or other purposes. The data may be streamed via a communication interface (e.g., the communication interface 211) of the transaction streaming platform 140. Each transaction authorization request and the corresponding data received and streamed by the transaction streaming data platform 140 may be referred to as a production transaction authorization determination event.

At step 340, the rules/models execution testing platform 110 may detect a production transaction authorization determination event at the transaction streaming data platform 140.

At step 342, in response to detecting the production transaction authorization determination event, the rules/models execution testing platform 110 may instantiate a new rules test session for executing the business rules specified in the corresponding test job configured and associated with the test job session instantiated in step 308.

Figure 3D:
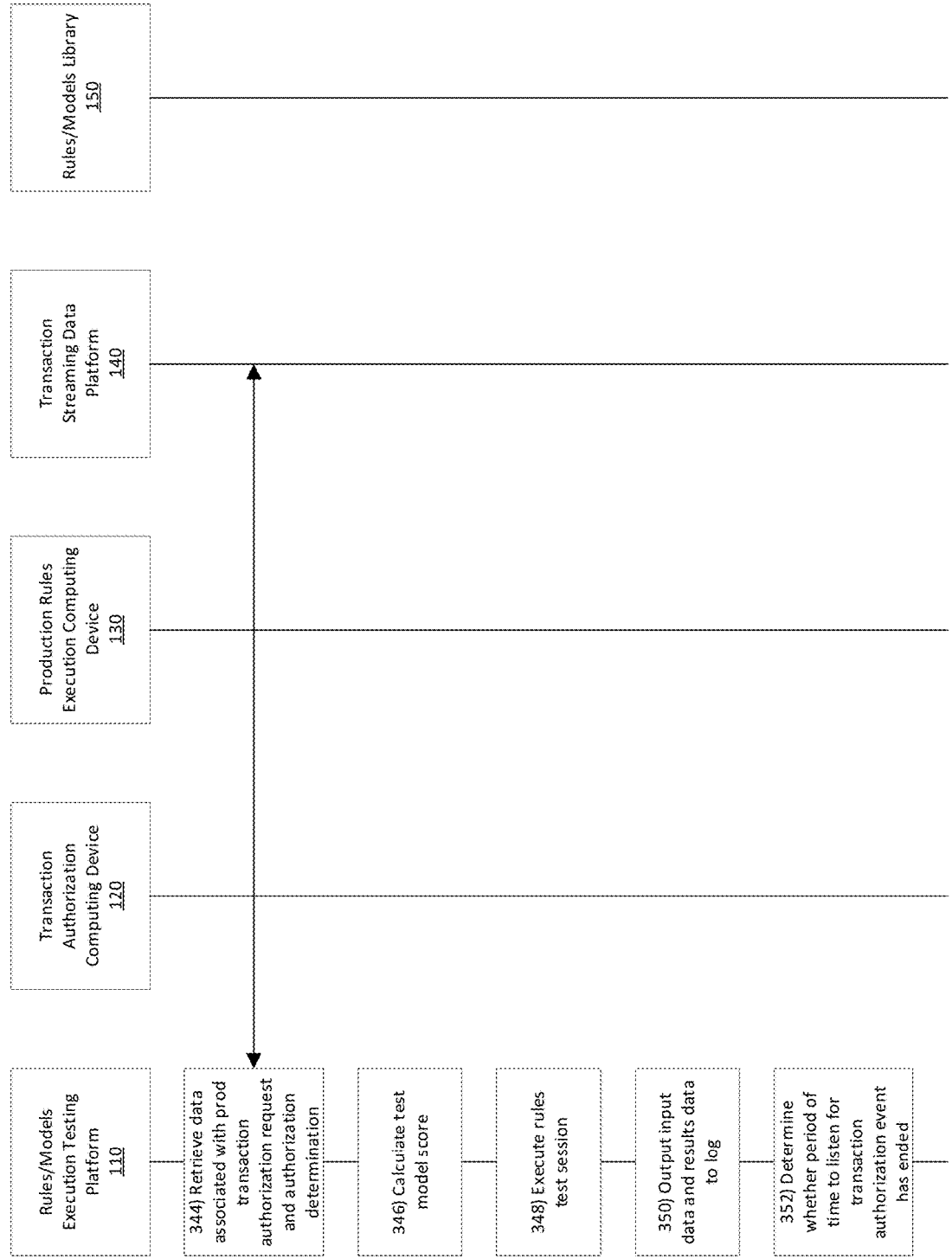

Referring to FIG. 3D, at step 344, the transaction authorization event listening module 112e may cause or enable the rules/models execution testing platform 110 to retrieve or receive, via the one or more communication interfaces 114, the transaction authorization determination event data from the transaction streaming data platform 140. The data may be retrieved or received after, during, or before instantiating the rules test session in step 342. For instance, the transaction authorization event listening module 112e may cause or enable the rules/models execution testing platform 110 to receive or retrieve, from the transaction streaming data platform 140, live production data associated with a transaction authorization request as well as a production authorization decision associated with the transaction authorization request. For instance, the transaction authorization event listening module 112e may cause or enable the rules/models execution testing platform 110 to receive, from the transaction streaming data platform 140, the transaction authorization request input information sent from the merchant transaction system 160 to the transaction authorization computing device 120, the features data retrieved by the production rules execution computing device 130 from the operational data store 175, the model score calculated by the model scoring computing device 170, and the authorization decision determined by the production rules execution computing device 130.

At step 346, the model score calculation module 112f may cause or enable the rules/models execution testing platform 110 may calculate a test model score using a model algorithm specified in the corresponding configured test job and received in step 316. The model score may indicate an overall degree of risk associated with the transaction, consumer, and/or the merchant associated with the transaction authorization request. The model score may be used together with additional information in the transaction authorization determination process to evaluate the transaction and make predictions about the degree of risk associated with the transaction. In some instances, the rules/models execution testing platform 110 may employ a machine learning model and/or one or more machine learning datasets to calculate the test model score.

At step 348, the rule execution module 112g may cause or enable the rules/models execution testing platform 110 to use the transaction authorization input information, the features data, and the production model score, received at step 344 from the transaction streaming data platform 140, as input to the business rules specified in the corresponding configured test job and received in step 316, and may execute the rules test session. In some cases, the test model score calculated at step 346 may be used as input to the business rules being tested, instead of the received production model score. In executing the business rules during the rules test session, the rule execution module 112g may cause or enable the rules/models execution testing platform 110 to determine a test authorization decision using the live production data. After execution of the business rules is complete, the rule execution module 112g may cause or enable the rules/models execution testing platform 110 to terminate the rules test session.

At step 350, the output generation module 112h may cause or enable the rules/models execution testing platform 110 to output, to one or more logs, all of the information associated with each of the rules test session. Step 350 may be performed during or after step 348. For example, the output generation module 112h may cause or enable the rules/models execution testing platform 110 to output, to one or more logs, information received from the transaction streaming data platform 140 (such as the production transaction authorization input information, the features data, the production model score, and the production authorization decision), the test model score, and the test authorization decision. The output generation module 112h may cause or enable the rules/models execution testing platform 110 to log additional information, such as, but not limited to, an elapsed amount of time to execute the business rules in production, an elapsed amount of time to calculate the model score in production, any warnings or errors encountered in production, an elapsed amount of time to execute the business rules in test, an elapsed amount of time to calculate the model score in test, any warnings or errors encountered in test, and the like. Additional information identifying the test job (e.g., the test job key), the business rules and the models used in both production and test may be included in the one or more logs, and information identifying the configuration of the test job may likewise be included. The output generation module 112h may cause or enable the rules/models execution testing platform 110 to store the one or more logs may at the memory 112 of the rules/models execution testing platform 110 or at a different location or device. Alternatively or additionally, the rules/models execution testing platform 110 may employ one or more external modules, applications, systems, computers, etc. to perform one or more of the above-described features of the output generation module 112h. The one or more external modules, applications, systems, computers, etc. may perform the one or more features and may send results back to the output generation module 112h. In some cases, the results may require additional processing by the output generation module 112h.

At step 352, after the rules test session has ended, the transaction authorization event listening module 112e may cause or enable the rules/models execution testing platform 110 to determine whether to continue listening for additional transaction authorization events from the transaction streaming data platform 140. The rules/models execution testing platform 110 may determine whether to continue listening based on determining whether a time for running the test job has expired based on the length of time or the number of authorizations to test for specified in the test job configuration.

Referring to FIG. 3E, at step 354, if the time for running the test job has not expired, the transaction authorization event listening module 112e may cause or enable the rules/models execution testing platform 110 to continue to listen for transaction authorization events streamed from the transaction streaming data platform 140.

At step 356, if the time for running the test job has expired, the transaction authorization event listening module 112e may cause or enable the rules/models execution testing platform 110 to discontinue listening for transactions authorization events and, at step 358, the test job session instantiation module 112d may cause or enable the rules/models execution testing platform 110 to terminate the test job session instantiated at step 308. Upon terminating the test job session, the test job session instantiation module 112d may cause or enable the rules/models execution testing platform 110 to release the computing resources allocated for the test job session.

At step 360, after the test job session has been terminated, the data aggregation and analysis module 112i may cause or enable the rules/models execution testing platform 110 to aggregate and analyze results from the test job session based on the information logged at step 350. For instance, the data aggregation and analysis module 112i may cause or enable the rules/models execution testing platform 110 to total the number of transaction authorization requests received during a given test job session. The data aggregation and analysis module 112i may further cause or enable the rules/models execution testing platform 110 to determine a total number of authorization decisions that were the same between production and test, and a total number of authorization decisions that were different between production and test. The data aggregation and analysis module 112i may cause or enable the rules/models execution testing platform 110 to make determinations on a rule-by-rule basis. That is, the data aggregation and analysis module 112*i* may cause or enable the rules/models execution testing platform 110 to identify each rule triggered during the test job session and the corresponding rules triggered in the live production environment for the same set of transaction authorization requests and determine, for each rule, the number of matching and mismatching decisions between test and production. The data aggregation and analysis module 112*i* may cause or enable the rules/models execution testing platform 110 to analyze the received production data and the data associated with the test job session to determine other metrics as well—such as, but not limited to, an average latency for processing a transaction authorization request or executing one or more of the rules in test and in production; the number of transaction authorizations requests processed over a period of time in test and in production; an average number of transaction authorization requests processed for a unit of time (e.g., per second, per minute, etc.) in test and in production; a number of timeout exceptions in test and in production; etc. The data aggregation and analysis module 112*i* may further cause or enable the rules/models execution testing platform 110 to analyze one or more model scores calculated in test with corresponding model scores calculated in production. The data aggregation and analysis module 112*i* may cause or enable the rules/models execution testing platform 110 to determine additional metrics—such as, the number of matching model scores, the number of mismatching model scores, latency in calculating the model score in test and in production, etc. The determination and analysis of such metrics may be used, by the test job modification module 112*k* and/or the rules/models production release module 112*l*, to make automatic determinations regarding whether one or more testing parameters should be adjusted and/or whether the test rules and/or models may be released to production. Alternatively or additionally, the rules/models execution testing platform 110 may employ one or more external modules, applications, systems, computers, etc. to perform one or more of the above-described features of the data aggregation and analysis module 112*i*. The one or more external modules, applications, systems, computers, etc. may perform the one or more features and may send results back to the data aggregation and analysis module 112*i*. In some cases, the results may require additional processing by the data aggregation and analysis module 112*i*.

At step 362, the test results generation module 112*j* may cause or enable the rules/models execution testing platform 110 to generate one or more results reports based on the aggregated and analyzed data from step 360. The test results generation module 112*j* may cause or enable the rules/models execution testing platform 110 to output the one or more reports to the display 113 or may transmit, via the one or more communication interfaces 114, the one or more reports to a computing device, such as to the local user computing device 105*a* or the remote user computing device 105*b*. Alternatively or additionally, the rules/models execution testing platform 110 may employ one or more external modules, applications, systems, computers, etc. to perform one or more of the above-described features of the test results generation module 112*j*. The one or more external modules, applications, systems, computers, etc. may perform the one or more features and may send results back to the test results generation module 112*j*. In some cases, the results may require additional processing by the test results generation module 112*j*.

Figure 3F:
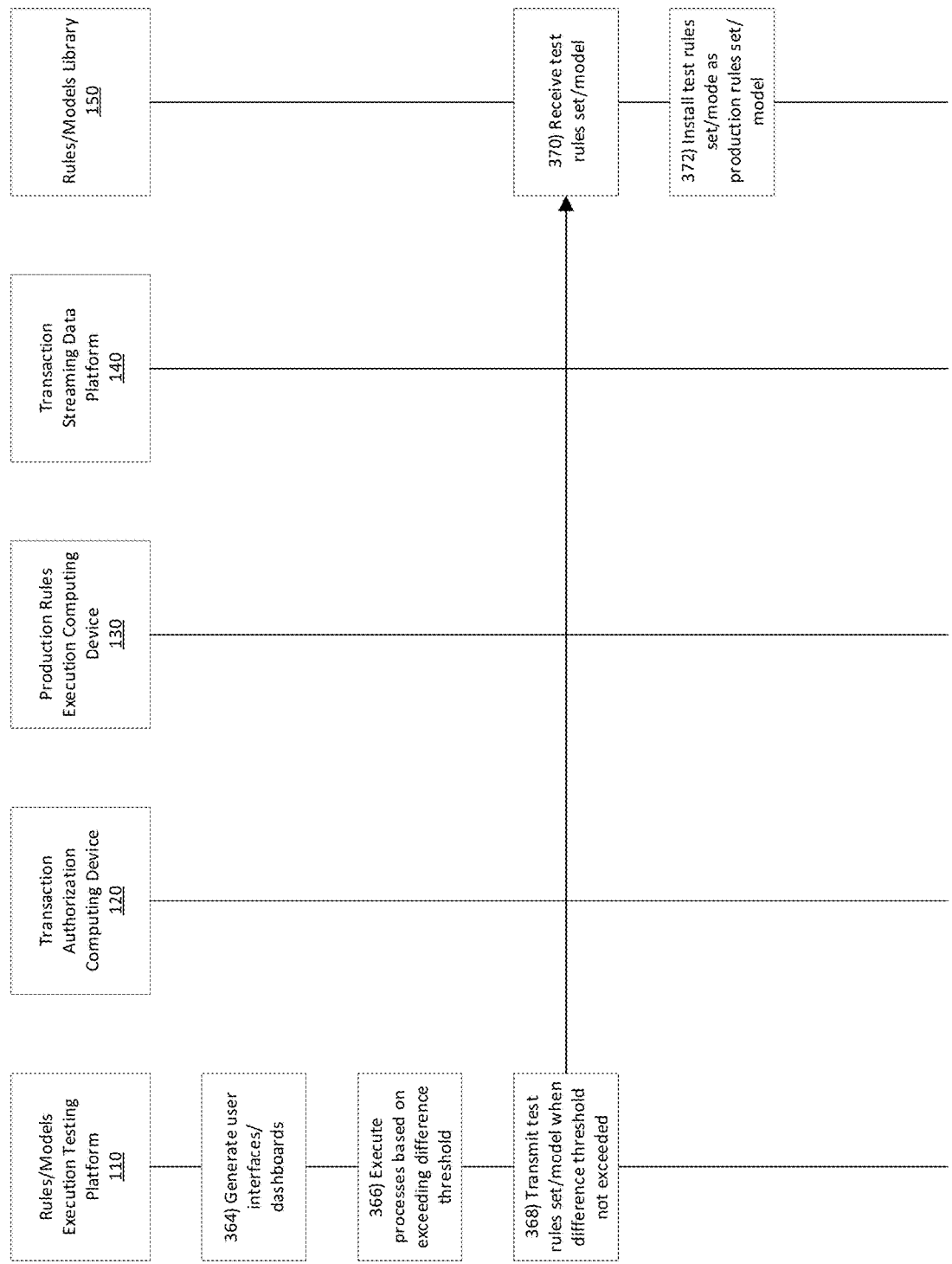

Referring to FIG. 3F, at step 364, the test results generation module 112*j* may further cause or enable the rules/models execution testing platform 110 to generate one or more user interfaces based on the aggregated and analyzed test results. The test results generation module 112*j* may cause or enable the rules/models execution testing platform 110 to output the one or more user interfaces to the display 113. The generated user interface may be similar to user interface 800 shown in FIG. 8. The test results generation module 112*j* may further cause or enable the rules/models execution testing platform 110 to provide tools that allow a user to customize the user interface. The test results generation module 112*j* may cause or enable the rules/models execution testing platform 110 to allow drilling down from the aggregated data into more granular data related to the test job session and to output, to the display 113, a user interface that displays the granular data. For example, the test results generation module 112*j* may further cause or enable the rules/models execution platform 110 to output, to the display 113, a user interface with data from the test job log, such as user interface 700 shown in FIG. 7. The user interfaces 700 and/or 800 may additionally or alternatively be output to another computing device, such as to a display associated with the local user computing device 105*a* or the remote user computing device 105*b*.

At step 366, the data aggregation and analysis module 112*i* may cause or enable the rules/models execution testing platform 110 to determine whether one or more of the aggregated results exceeds one or more difference thresholds. The difference thresholds may be pre-configured or may be user-defined. For instance, the data aggregation and analysis module 112*i* may cause or enable the rules/models execution testing platform 110 to determine whether there are more than a threshold amount of transaction authorization decision differences between test and production. For example, a threshold amount of transaction authorization decision differences may be set to 1,000 for a first test job. The threshold amount of transaction authorization decision differences may be pre-configured or may be alternatively or additionally set as a parameter in the first test job. Different threshold amounts may be set for each of the different test jobs. If for example, during the first test job session, 10,000 transaction authorization events were processed and 3,000 resulted in decline authorization decisions, while 1,000 of the corresponding transaction authorization requests resulted in decline authorizations when processed in production, the data aggregation and analysis module 112*i* may determine that the decision difference of 2,000 (i.e., 3,000-1,000) exceeds the threshold amount of transaction authorization decision differences.

Difference threshold values may be set for other aggregated results as well. For instance, a threshold amount of model score differences may be set for determining whether there are more than a threshold amount of model score differences between model scores calculated for transaction authorization requests during a test job session versus those calculated for the corresponding transaction authorization requests in production. An average latency difference threshold may be set for determining whether an average latency for processing the transaction authorization requests during a test job session differs by more than a threshold amount from an average latency for processing corresponding transaction authorization requests in production. Difference thresholds may be set for determining whether an average latency for processing a particular business rule or calculating a model score differs between test and production by more than a threshold amount. Various other difference threshold may be set as well to compare any of the results from the test job sessions.

If, at step 366, one or more of the aggregated results exceeds one or more of the difference thresholds, the data aggregation and analysis module 112*i* may cause or enable the rules/models execution testing platform 110 to cause one or more processes to be executed. For instance, the data aggregation and analysis module 112*i* may cause or enable the rules/models execution testing platform 110 to transmit a notification to a computing device, such as the local user computing device 105*a* or the remote user computing device 105*b*, associated with a user; to instruct the test job modification module 112*k* to determine one or more parameters values to adjust for a subsequent test job session and automatically adjust the parameter values accordingly; to identify one or more rules and/or model algorithms attributable to a threshold percentage of the differences, determine the differences between the identified one or more rules and/or model algorithms, and output information (or transmit a notification to a computing device, such as the local user computing device 105*a* or the remote user computing device 105*b*, associated with a user) about the determined differences; etc.

At step 368, the data aggregation and analysis module 112*i* may cause or enable the rules/models execution testing platform 110 to determine whether the aggregated results do not exceed one or more of difference thresholds (for example, if there are less than or equal to a threshold amount of transaction authorization decision differences between test and production, if an average latency for processing the transaction authorization requests or executing the business rules differs between test and production by less than or equal to a threshold amount, or if there are less than or equal to a threshold amount of model score differences between test and production, and the like). If one or more of the aggregated results do not exceed one or more of the difference thresholds, the data aggregation and analysis module 112*i* may cause or enable the rules/models execution testing platform 110 to instruct the rules/models production release module 112*l* to cause the corresponding rules and/or models to be released to a production environment. The rules/models production release module 112*l* may release one or more rules and/or models to production by causing or enabling the rules/models execution testing platform 110 to transmit the rules and/or models to the rules/model library 150 via the one or more communication interfaces 114.

At step 370, the rules/models library 150 may receive the one or more rules and/or models from the rules/models execution testing platform 110. The rules/models library 150 may receive the one or more rules and/or models via a communication interface (e.g., communication interface 211) of the rules/models library 150.

At step 372, the rules/models library 150 may store the received one or more rules and/or models as production rules and/or models. In some instances, where the business rule or model may already be stored in the rules/library 150 or in another storage location as a test rule or model, the rules/models production release module 112*l* may cause or enable the rules/models execution testing platform 110 to instruct the rules/models library 150 to update a version number, or other identifier for identifying the business rule or model as a production rule or model. The rules/models production release module 112*l* may cause or enable the rules/models execution testing platform 110 to transmit, via the one or more communication interfaces 114, to a computing device (such as the local user computing device 105*a*, the remote user computing device 105*b*, or the rules/models execution testing platform 110), information notifying of the release to production.

Figure 4:
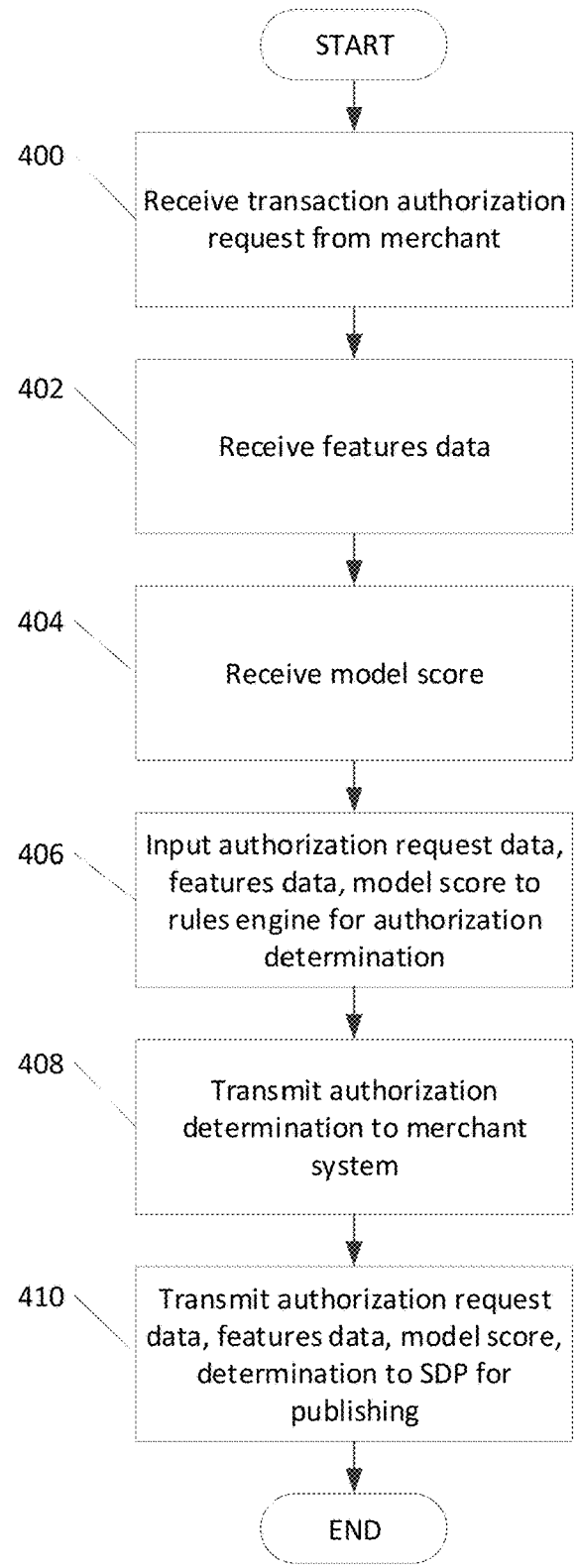
FIG. 4 shows a flow chart of an example method of publishing live production data for use in performing rules and models testing functions, in accordance with one or more aspects described herein.

Referring to FIG. 4, a flow chart of an example method of publishing live production data for use in performing rules and models testing functions is provided. The example method may be a method of an embodiment in which the production rules execution computing device 130 is incorporated into the transaction authorization computing device 120 as a rules engine module of the transaction authorization computing device 120 and the devices operate as a single device.

At step 400, the transaction authorization computing device 120 may receive a transaction authorization request from the merchant transaction system 160. For instance, when a consumer's credit card is swiped for a purchase transaction by a merchant associated with the merchant transaction system 160, the merchant transaction system 160 may communicate with a bank or other credit institution, for example, to receive an authorization for the purchase transaction. For instance, the merchant system 160 may transmit a message, via the public network 190, to the private network 180, and the transaction authorization computing device 120 connected thereto, to request an authorization decision for the purchase transaction.

At step 402, the transaction authorization computing device 120 may retrieve or receive information necessary to make the authorization decision. For instance, the transaction authorization computing device 120 may retrieve or receive from the operational data store 175, features data associated with the transaction authorization request. For instance, the features data may include average spend amounts for the merchant and/or consumer, spending patterns of the consumer, credit limits, etc. The transaction authorization computing device 120 may retrieve or receive additional information from the operation data store 175 for making the authorization decision.

At step 404, the transaction authorization computing device 120 may receive further a model score associated with the transaction authorization request and calculated by the model scoring computing device 170. The model score may indicate an overall degree of risk associated with the transaction, the consumer, and/or the merchant associated with the transaction authorization request. The model score may be used together with the features data and/or other data in the transaction authorization determination process to evaluate the purchase transaction and to make predictions about the degree of risk associated with the purchase transaction.

At step 406, the transaction authorization computing device 120 may input the transaction authorization request information, the features data, the model score, and/or other data to the rules engine module for an authorization determination for the purchase transaction. The rules engine module may access or retrieve one or more business rules stored in the rules/models library 150 or other storage location and execute the one or more business rules for making the authorization determination. The business rule may use the data input to the rules engine module and may employ certain logic, decision trees, algorithms, or the like to make the authorization determination.

At step 408, the transaction authorization computing device 120 may transmit the authorization determination for the transaction authorization request to the merchant transaction system 160.

At step 410, the transaction authorization computing device 120 may additionally transmit the data used to make the production authorization determination for the transaction authorization request (i.e., the transaction authorization request information received from the merchant transaction system 160, the features data, any additional data, the model score, etc.) and the resulting authorization decision to the transaction streaming data platform 140 for publishing. The transaction streaming data platform 140 may publish or stream the received data in real-time for use by one or more other computing devices for purposes of reporting, analytics, testing, or the like.

Figure 5A:
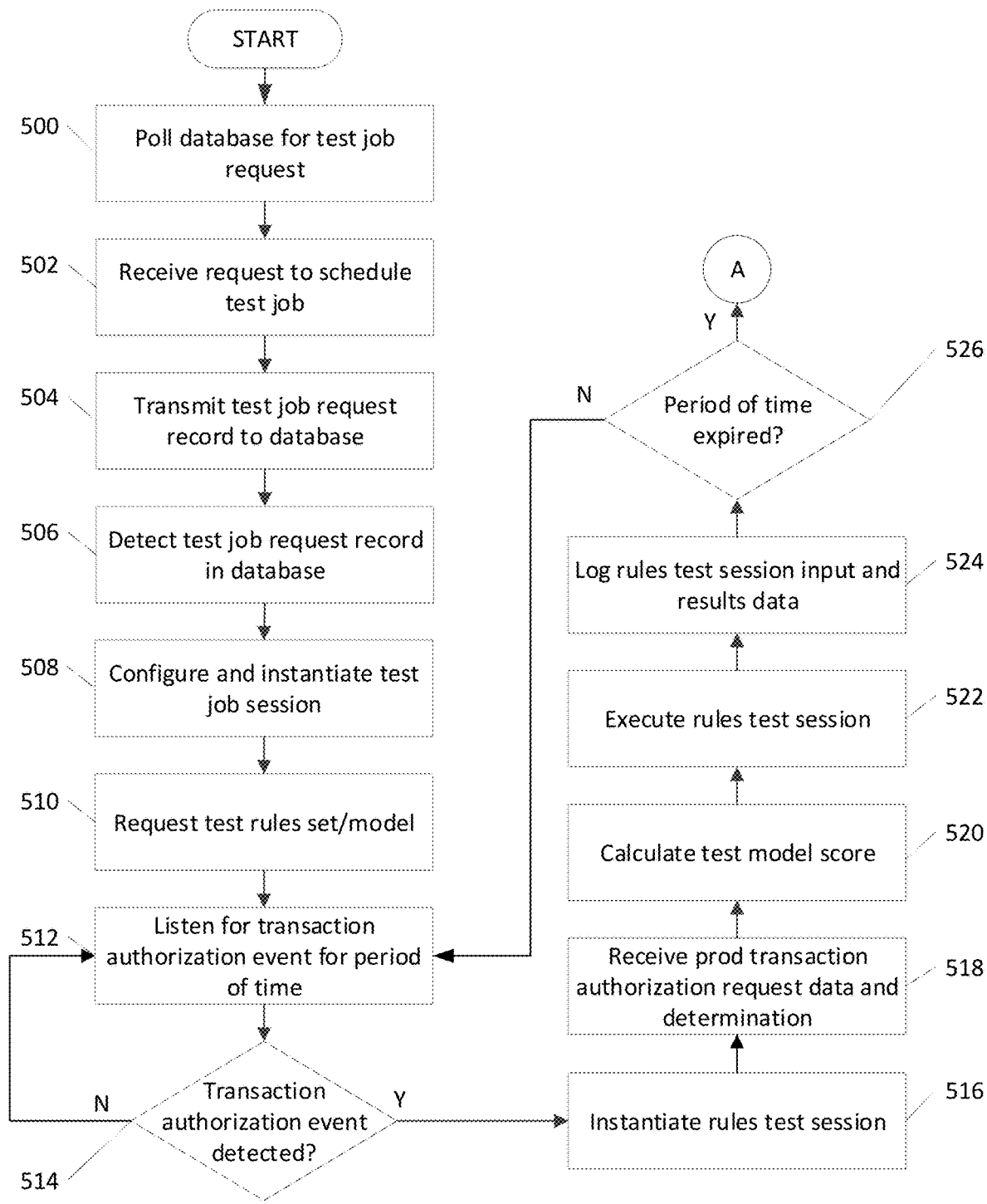
FIGS. 5A and 5B show a flow chart of an example method of performing rules and models testing function, in accordance with one or more aspects described herein.
Figure 5B:
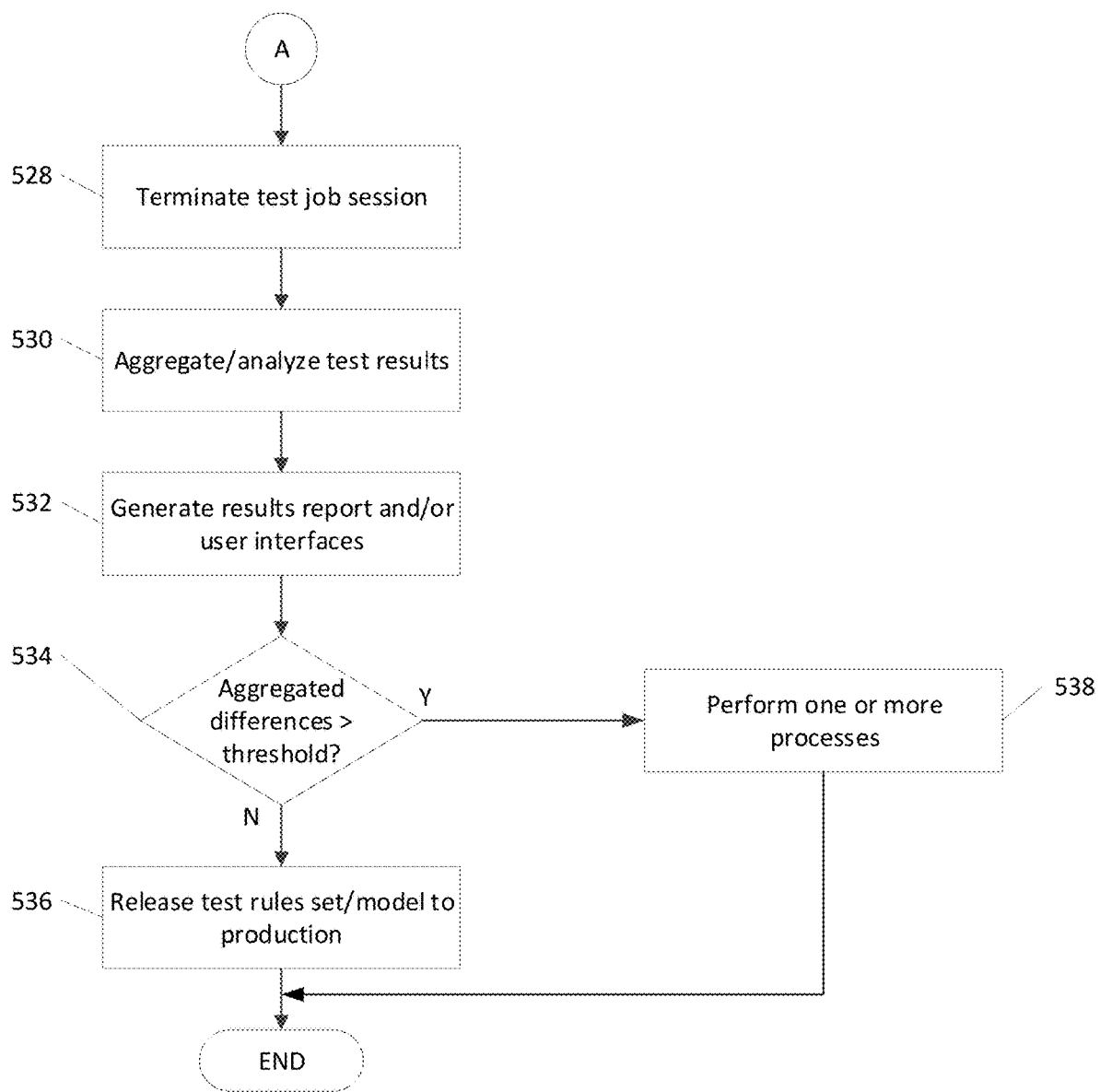

Referring to FIGS. 5A and 5B, a flow chart of an example method of performing rules and models execution testing function is provided. The example method may be a method of the rules/models execution testing platform 110.

Referring to FIG. 5A, at step 500, the rules/models execution testing platform 110 may poll the test jobs database 165 for one or more test job request records which may have been scheduled by a user or an application.

At step 502, the rules/models execution testing platform 110 may receive a request to schedule a test job. For instance, a user may utilize a user interface, such as user interface 600, to schedule the test job or an API may be invoked to schedule the test job. The test job may be scheduled for testing one or more new business rules or models. The test job request may include one or more parameters values for configuring the test job. In response to receiving the request to schedule the test job, the rules/models execution testing platform 110 may generate a test job request record.

At step 504, the rules/models execution testing platform 110 may transmit the test job request record to the test jobs database 165. The test job request record may include some or all of the parameter values specified during the request to schedule the test job. The parameter values may include one or more business rules and/or models to be tested during the test job, an amount of time for which to run the test job, a number of transaction authorizations for which to run the test job, etc. The parameter values may include additional information such as described in step 304 of FIG. 3A.

At step 506, the rules/models execution testing platform 110 may, during polling of the test jobs database 165, detect the test job request record in the test jobs database 165.

At step 508, in response to detecting the test job request record in the test jobs database 165, the rules/models execution testing platform 110 may parse the parameters identified in the test job request record, configure a new test job in accordance with the parameter information, and instantiate a new test job session. Instantiating the test job session may cause computing resources to be allocated to the test job session.

At step 510, the rules/models execution testing platform 110 may request and receive, from the rules/models library 150, one or more rules or rulesets specified in the configured test job and/or one or more models or models algorithm specified therein.

At step 512, the rules/models execution testing platform 110 may begin to listen for live production transaction authorization events streamed from the transaction streaming data platform 140.

At step 514, the rules/models execution testing platform 110 may determine whether a production transaction authorization event is detected at the transaction streaming data platform 140.

If a production transaction authorization event is not detected, the rules/models execution testing platform 110 may return to step 512 to continue listening for a production transaction authorization event.

If a production transaction authorization event is detected, then at step 516, a new rules test session may be instantiated for executing the rules and/or models received at step 510 for the test job configured and associated with the test job session instantiated in step 508.

At step 518, the rules/models execution testing platform 110 may retrieve or receive transaction authorization event data from the transaction streaming data platform 140. The transaction authorization event data may include information associated with the original transaction authorization request from the merchant transaction system 160, additional information used to make the production authorization determination, such as features data and a production model score, and the final production authorization decision. The transaction authorization event data may reflect live production data that is streamed to the transaction streaming data platform 140.

At step 520, the rules/models execution testing platform 110 may calculate a test model score using a model or model algorithm specified in the corresponding configured test job and received in step 510.

At step 522, the rules/models execution testing platform 110 may execute the rules test session using the business rules specified in the corresponding configured test job and received in step 510. The rules/models execution testing platform 110 may use the original transaction authorization request, the features data, and the production or test model score, as input to the business rules. In executing the rules test session, the rules/models execution testing platform 110 may determine a test authorization decision using the live production data. The rules/models execution testing platform 110 may terminate the rules test session when execution of the business rules is complete.

At step 524, the rules/models execution testing platform 110 may output, to one or more logs, all of the data used as input to the test session and the resulting test authorization determination. Additional information, such as, but not limited to, test job configuration information may be output to the log as well. The information may be output to the log during the rules test session or after the rules test session has ended.

After the rules test session has ended, the rules/models execution testing platform 110, at step 526, may determine, based on the test job configuration, whether a period for running the test job has expired, e.g., whether the length of time or the number of transaction authorization requests to test for specified in the test job configuration has been met. For instance, the test job may have been configured to run for 5 hours, or to run for 100,000 transaction authorization requests.

If the period for running the test job has not expired, the rules/models execution testing platform 110 may return to step 512 and may continue to listen for additional transaction authorization events streamed from the transaction streaming data platform 140.

If the time for running the test job has expired, referring to FIG. 5B, at step 528, the rules/models execution testing platform 110 may discontinue listening for transactions authorization events and may terminate the test job session instantiated at step 508. Computing resources allocated to the test job session may be released upon termination of the test job session.

At step 530, the rules/models execution testing platform 110 may aggregate and analyze results from the test job session based on the information logged at step 524. Various metrics associated with the test job session, and the various transaction authorization requests processed therein, may be determined and compared with corresponding metrics associated with the corresponding transaction authorization requests processed in production. For instance, the rules/models execution testing platform 110 may determine metrics, such as a total the number of transaction authorization requests received during the test job session, a number of the transaction authorization requests declined in production, a number of the transaction authorization requests declined in test, a number of authorization decisions that were the same between production and test, a number of authorization decisions that were different between production and test, a number of matching and mismatching authorization decisions between test and production for which a particular rule was invoked, an average elapsed time for processing the transaction authorization requests in production, an average elapsed time for processing the transaction authorization requests in test, an average elapsed time for executing a particular business rule in production, an average elapsed time for executing a particular business rule in test, an average elapsed time for executing a particular model algorithm in production, an average elapsed time for executing a particular model algorithm in test, an average latency difference associated with processing the transaction authorization requests in test versus production, an average latency difference associated with executing a particular rule in test versus production, an average latency for executing a particular model algorithm in test versus production; an average number of transaction authorization requests processed for a unit of time (e.g., per second, per minute, etc.) in test and in production; a number of timeout exceptions in test and in production; a number of matching and mismatching model scores between test and production, etc.

At step 532, the rules/models execution testing platform 110 may generate one or more results reports and/or user interfaces, such as user interfaces 700 and/or 800, based on the logged data from step 524 and/or the aggregated and analyzed data from step 530.

At step 534, the rules/models execution testing platform 110 may determine whether one or more of the aggregated results exceeds one or more difference thresholds associated with one or more of the determined metrics from step 530. For example, the rules/models execution testing platform 110 may determine whether there are more than a threshold amount of transaction authorization decision differences between test and production, whether an average latency for processing the transaction authorization requests or executing the business rules differs between test and production by more than a threshold amount, whether there are more than a threshold amount of model score differences between test and production, or the like.

If one or more of the aggregated results exceeds one or more difference thresholds, at step 538, the rules/models execution testing platform 110 may cause one or more processes to be executed. For instance, the rules/models execution testing platform 110 may transmit a notification to a computing device associated with a user; determine one or more parameters values to adjust for a subsequent test job session and automatically adjust the parameter values accordingly; identify one or more rules and/or model algorithms attributable to a threshold percentage of the differences, determine the differences between the identified one or more rules and/or model algorithms, and output information (or transmit a notification to a computing device) about the determined differences; etc.

If the aggregated results do not exceed any of the one or more difference threshold, at step 538, the rules/models execution testing platform 110 may cause the corresponding rules and/or models to be released to a production environment by transmitting the rules and/or models to the rules/model library 150.

Referring to FIG. 6, an example user interface 600 for scheduling a job for testing one or more rules or models is provided. The user interface 600 may be displayed on the display 113 of the rules/models execution testing platform 110, or may be displayed on another computing device, such as a display associated with the local user computing device 105a or the remote user computing device 105b. As mentioned, the user interface 600 may include a number of parameters for use in configuring the scheduled test job. The parameters need not be limited to those shown in user interface 600. Further, one or more additional user interfaces may be provided for retrieving an existing test job, interrupting a test job that is currently running, cancelling a test job scheduled for a future time, rescheduling a test job, editing a test job, etc. Additionally or alternatively, similar features may be provided through an API that may be invoked via a CLI or via another application.

Referring to FIG. 7, an example user interface 700 for displaying a rules/models testing log may be provided. The user interface 700 may be displayed on the display 113 of the rules/models execution testing platform 110, or may be displayed on another computing device, such as a display associated with the local user computing device 105a or the remote user computing device 105b. The testing log may include a record for each production authorization request that was received and processed by the rules/models execution testing platform 110 in a test job. The logged record may include, but need not be limited to, a test job key, some or all of the test job configuration information, the production transaction authorization input information, the features data, the production model score, the production authorization decision, the test model score, and the test authorization decision. Additional information, such as an amount of time to execute the business rules in production, an amount of time to calculate the model score in production, any warnings or errors encountered in production, an amount of time to execute the business rules in test, an amount of time to calculate the model score in test, any warnings or errors encountered in test, the business rules and the models used in both production and test, and the like.

Figure 8:
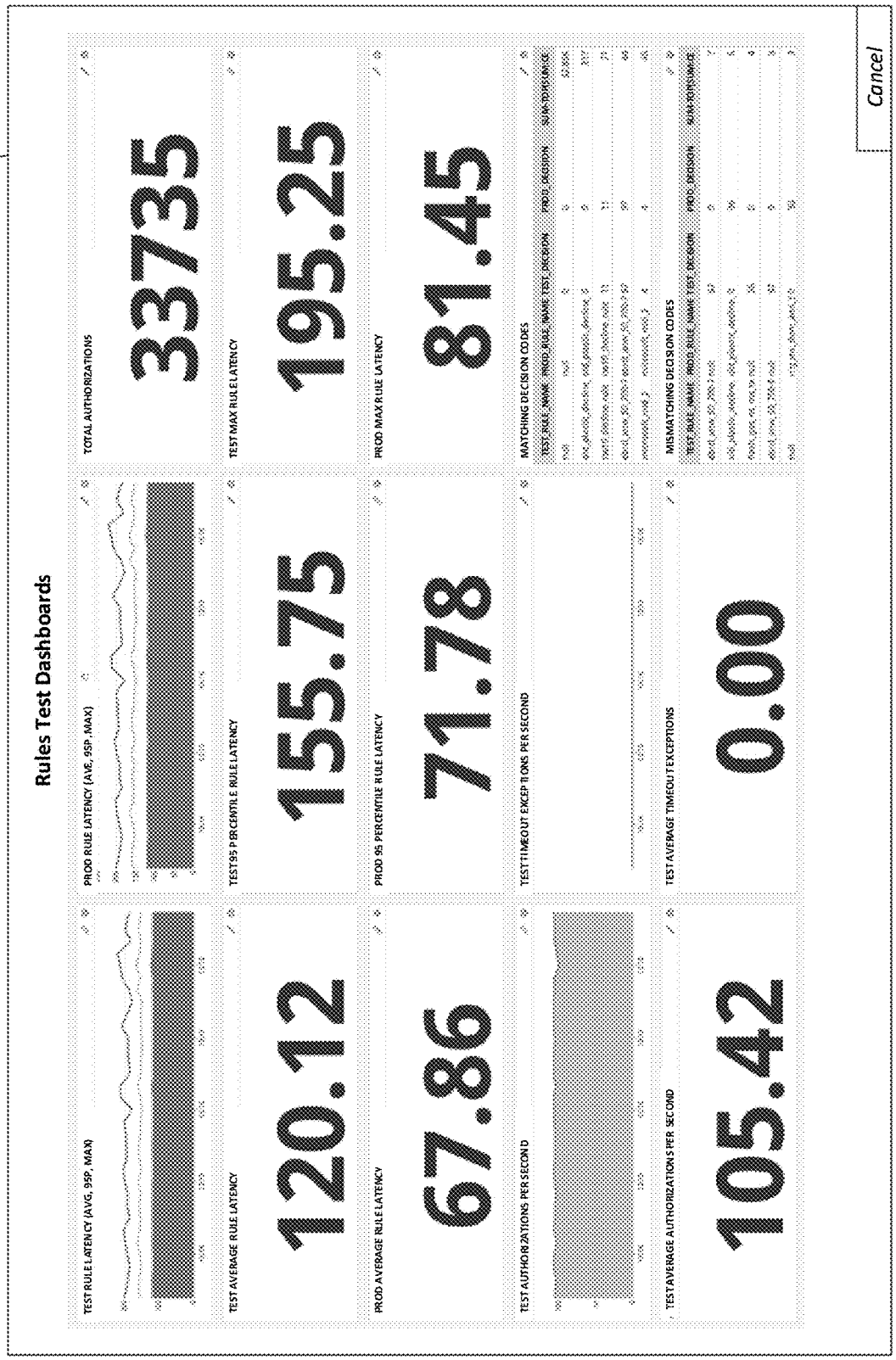
FIG. 8 illustrates an example user interface for displaying a dashboard of testing results and metrics, in accordance with one or more aspects described herein.

Referring to FIG. 8, an example user interface 800 for displaying a dashboard of testing results and metrics may be provided. The user interface 800 may be displayed on the display 113 of the rules/models execution testing platform 110, or may be displayed on another computing device, such as a display associated with the local user computing device 105a or the remote user computing device 105b. The user interface 800 may include some or all of the data that may be aggregated and/or analyzed by the rules/models execution testing platform 110 for a particular test job session. The rules/models execution testing platform 110 may provide tools to allow a user to customize the type of information that is displayed in the user interface and the manner in which it is displayed (e.g., line graphs, bar graphs, pie charts, area charts, tabular form, etc.)

One or more aspects disclosed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language, such as (but not limited to) HTML or XML. The computer-executable instructions may be stored on a computer-readable medium, such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole, or in part, in firmware or hardware equivalents such as integrated circuits, field programmable gate arrays (FPGA), and the like. Particular data structures may be used to more effectively implement one or more aspects disclosed herein, and such data structures are contemplated within the scope of computer-executable instructions and computer-usable data described herein. Various aspects disclosed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A non-transitory computer-readable medium storing instructions that, when executed, cause a server to:
   receive, from a transaction authorization computing device, a plurality of live production authorization requests;
   for each live production authorization request of the plurality of live production authorization requests:
      retrieve, from one or more databases, first data comprising authentication credentials corresponding to the live production authorization request;
      determine, based on the live production authorization request and the first data, and using a set of production rules, a production authorization decision for the live production authorization request;
      determine, based on the live production authorization request and the first data and using a first set of test rules, a first test authorization decision for the live production authorization request;
      determine, based on a comparison of the first test authorization decision with the production authorization decision, a decision difference between the first test authorization decision and the production authorization decision; and
      determine, based on a comparison of a first time period associated with the production authorization decision with a second time period associated with the first test authorization decision, a time difference;
   determine, in an execution testing platform, one or more decision differences by aggregating decision differences of the plurality of live production authorization requests;
   output, to a user device and based on a determination that the one or more decision differences exceeds a threshold amount of decision differences, information indicating the one or more decision differences;
   determine, in the execution testing platform, one or more time differences by aggregating time differences of the plurality of live production authorization requests;
   output, to the user device based on a determination that the one or more time differences exceeds a threshold amount of time differences, information indicating the one or more time differences;
   receive, from the user device, user input indicating a request to adjust one or more parameters of the first set of test rules; and
   adjust, based on the user input, the one or more parameters of the first set of test rules,
   wherein the adjusted one or more parameters are implemented for subsequent live production authorization requests.

2. The non-transitory computer-readable medium of claim 1, wherein the instructions, when executed, cause the server to:
   determine the set of production rules used for making live production authorization determinations; and
   retrieve, from a rule library, the first set of test rules.

3. The non-transitory computer-readable medium of claim 1, wherein the instructions, when executed, cause the server to:
   send, based on determining that the one or more decision differences does not exceed a first threshold value, the first set of test rules to production.

4. The non-transitory computer-readable medium of claim 1, wherein the instructions, when executed, cause the server to:
   receive one or more parameters for determining the first test authorization decision for each of the live production authorization requests, wherein at least one parameter, of the one or more parameters, indicates a threshold allowable time difference;
   determine, based on the one or more time differences, an average time difference; and
   output, based on determining that the average time difference exceeds the threshold allowable time difference, information indicating the average time difference.

5. The non-transitory computer-readable medium of claim 1, wherein the instructions, when executed, cause the server to:
   send, to the transaction authorization computing device:
      the production authorization decision for each of the live production authorization requests, and
      the first time period associated with determining the production authorization decision.

6. The non-transitory computer-readable medium of claim 1, wherein the instructions, when executed, cause the server to:
   add, based a determination that the one or more decision differences does not exceed a first threshold value, data associated with the first set of test rules in a production rules database.

7. The non-transitory computer-readable medium of claim 1, wherein the instructions, when executed, cause the server to:
   determine, based on the one or more decision differences, one or more parameters for executing a test authorization decision;

receive a plurality of additional live production authorization requests; and execute, for the plurality of additional live production authorization requests and based on the first set of test rules and the one or more parameters, a second test authorization decision.

8. The non-transitory computer-readable medium of claim 1, wherein the instructions, when executed, cause the server to:

receive one or more parameters for executing a test authorization decision, wherein at least one parameter of the one or more parameters indicates a threshold amount of allowable decision differences; and output, based on determining that the one or more decision differences exceeds the threshold amount of allowable decision differences, information indicating one or more differences between the set of production rules and the first set of test rules.

9. A method, comprising:

receiving, from a transaction authorization computing device, a plurality of live production authorization requests;

for each live production authorization request of the plurality of live production authorization requests:
retrieving, from one or more databases, first data, wherein the first data comprises data for making an authorization determination for the live production authorization request;
determining, based on the live production authorization request and the first data, and using a set of production rules, a production authorization decision for the live production authorization request;
determining, based on the live production authorization request and the first data and using a first set of test rules, a first test authorization decision for the live production authorization request;
determining, based on a comparison of the first test authorization decision with the production authorization decision, whether there exists a decision difference between the first test authorization decision and the production authorization decision; and
determining, based on a comparison of a first time period associated with the production authorization decision with a second time period associated with the first test authorization decision, a time difference;

determining, in an execution testing platform, one or more decision differences by aggregating decision differences of the plurality of live production authorization requests;

outputting, to a user device and based on a determination that the one or more decision differences exceeds a threshold amount of decision differences, information indicating the one or more decision differences;

determining, in the execution testing platform, one or more time differences by aggregating time differences of the plurality of live production authorization requests;

outputting, to the user device based on a determination that the one or more time differences exceeds a threshold amount of time differences, information indicating the one or more decision differences;

receiving, from the user device, user input indicating a request to adjust one or more parameters of the first set of test rules; and adjusting, based on the user input, the one or more parameters of the first set of test rules, wherein the adjusted first set of test rules are implemented for subsequent live production authorization requests.

10. The method of claim 9, further comprising:
determining the set of production rules used for making live production authorization determinations; and
retrieve, from a rule library, the first set of test rules.

11. The method of claim 10, further comprising
determining a second set of test rules; and
for each live production authorization request of the plurality of live production authorization requests:
determining, based on the live production authorization request, the first data, and the second set of test rules, a second test authorization decision for the live production authorization request; and
comparing the second test authorization decision with at least one of the first test authorization decision and the production authorization decision; and
selecting, based on comparisons of the second test authorization decision with at least one of the first test authorization decision and the production authorization decision for each of the plurality of live production authorization requests, one or more of the first set of test rules and the second set of test rules to send to production.

12. The method of claim 9, further comprising:
sending, to the transaction authorization computing device:
the production authorization decision for each of the live production authorization requests, and
the first time period associated with determining the production authorization decision.

13. The method of claim 9, further comprising:
sending, based on determining that the one or more decision differences does not exceed a first threshold value, the first set of test rules to production.

14. The method of claim 9, further comprising:
receiving one or more parameters for executing a test authorization decision, wherein at least one parameter of the one or more parameters indicates a threshold amount of allowable decision differences; and
outputting, based on determining that the one or more decision differences exceeds the threshold amount of allowable decision differences, information indicating one or more differences between the set of production rules and the first set of test rules.

15. The method of claim 9, further comprising:
determining, based on the one or more decision differences, one or more parameters for executing a test authorization decision;
receiving a plurality of additional live production authorization requests; and
executing, for the plurality of additional live production authorization requests and based on the first set of test rules and the one or more parameters, a second test authorization decision.

16. The method of claim 9, further comprising:
receiving one or more parameters for determining the first test authorization decision for each of the live production authorization requests, wherein at least one parameter, of the one or more parameters, indicates a threshold allowable time difference;
determining, based on the one or more time differences, an average time difference; and
outputting, based on determining that the average time difference exceeds the threshold allowable time difference, information indicating the average time difference.

17. A rules execution computing device comprising:
one or more processors; and
memory storing computer-readable instructions that, when executed by the one or more processors, cause the rules execution computing device to:
  determine a set of production rules used for making live production authorization determinations;
  determine a first set of test rules;
  receive, from a transaction authorization computing device, a plurality of live production authorization requests;
  for each live production authorization request of the plurality of live production authorization requests:
    retrieve, from one or more databases, first data, wherein the first data comprises data for making an authorization determination for live production authorization request;
    determine, based on the live production authorization request and the first data, and using a set of production rules, a production authorization decision for the live production authorization request;
    determine, based on the live production authorization request and the first data and using a first set of test rules, a first test authorization decision for the live production authorization request;
    determine, based on a comparison of the first test authorization decision with the production authorization decision, whether there exists a decision difference between the first test authorization decision and the production authorization decision; and
    determine, based on a comparison of a first time period associated with the production authorization decision with a second time period associated with the first test authorization decision, a time difference;
  determine, in an execution testing platform, one or more decision differences by aggregating decision differences of the plurality of live production authorization requests;
  output, to a user device and based on a determination that the one or more decision differences exceeds a threshold amount of decision differences, information indicating the one or more decision differences;
  determine, in the execution testing platform, one or more time differences by aggregating time differences of the plurality of live production authorization requests;
  output, to the user device, information indicating the one or more time difference;
  determine, in the execution testing platform, one or more time differences by aggregating time differences of the plurality of live production authorization requests;
  output, to the user device based on a determination that the one or more time differences exceeds a threshold amount of time differences, information indicating the one or more time differences;
  receive, from the user device, user input indicating a request to adjust one or more parameters of the first set of test rules;
  adjust, based on the user input, the one or more parameters associated with the first set of test rules;
  receive a plurality of additional live production authorization requests; and
  execute, for the plurality of additional live production authorization requests and based on the first set of test rules and the adjusted one or more parameters, a second test authorization decision.

18. The rules execution computing device of claim 17, wherein the instructions, when executed by the one or more processors, further cause:
  receive one or more parameters for executing the first test authorization decision, wherein at least one parameter, of the one or more parameters, indicates a threshold allowable time difference;
  determine, based on the one or more time differences, an average time difference; and
  output, based on determining that the average time difference exceeds the threshold allowable time difference, information indicating the average time difference.

19. The rules execution computing device of claim 17, wherein the instructions, when executed by the one or more processors, further cause:
  receive a second set of test rules;
  for each live production authorization request of the plurality of live production authorization requests:
    determine, based on the live production authorization request and the first data, and using the second set of test rules, a second test authorization decision for the live production authorization request;
    determine a third time period associated with determining the second test authorization decision for the live production authorization request; and
    compare the second test authorization decision with at least one of the first test authorization decision and the production authorization decision; and
  select, based on comparisons of the second test authorization decision with at least one of the first test authorization decision and the production authorization decision for each of the plurality of live production authorization requests and further based on a determination that the third time period satisfies a threshold, one or more of the first set of test rules and the second set of test rules to send to production.

20. The rules execution computing device of claim 17, wherein the instructions, when executed by the one or more processors, further cause:
  add, based on determining that the one or more decision differences does not exceed a first threshold value, data associated the first set of test rules in a production rules database.

* * * * *